US009372707B2

(12) United States Patent
Chigusa et al.

(10) Patent No.: US 9,372,707 B2
(45) Date of Patent: Jun. 21, 2016

(54) COMPUTER, VIRTUAL MACHINE DEPLOYMENT METHOD AND PROGRAM

(75) Inventors: Kentaro Chigusa, Tokyo (JP); Yukio Nakano, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 67 days.

(21) Appl. No.: 14/358,376

(22) PCT Filed: Nov. 18, 2011

(86) PCT No.: PCT/JP2011/006454
§ 371 (c)(1),
(2), (4) Date: May 15, 2014

(87) PCT Pub. No.: WO2013/072978
PCT Pub. Date: May 23, 2013

(65) Prior Publication Data
US 2014/0259015 A1    Sep. 11, 2014

(51) Int. Cl.
*G06F 9/46*  (2006.01)
*G06F 9/455*  (2006.01)
*G06F 9/50*  (2006.01)

(52) U.S. Cl.
CPC ........ *G06F 9/45533* (2013.01); *G06F 9/45558* (2013.01); *G06F 9/5044* (2013.01); *G06F 9/505* (2013.01); *G06F 2009/4557* (2013.01)

(58) Field of Classification Search
CPC .............. G06F 9/4881; G06F 9/45533; G06F 9/45558; G06F 9/5044; G06F 9/505; G06F 2009/4557
See application file for complete search history.

(56) References Cited

U.S. PATENT DOCUMENTS

| 2009/0106409 A1 | 4/2009 | Murata |
| 2009/0138887 A1 | 5/2009 | Uehara et al. |
| 2014/0223430 A1* | 8/2014 | Stuempfle ........... G06F 9/45533 718/1 |

FOREIGN PATENT DOCUMENTS

| JP | 2009-116852 A | 5/2009 |
| JP | 2009-151745 A | 7/2009 |
| JP | 2011-013822 A | 1/2011 |
| JP | 2011-095871 A | 5/2011 |

OTHER PUBLICATIONS

PCT International Search Report and Written Opinion on application PCT/JP2011/006454 mailed Jan. 17, 2012; 9 pages; with English translation of Search Report.

* cited by examiner

*Primary Examiner* — Camquy Truong
(74) *Attorney, Agent, or Firm* — Foley & Lardner, LLP

(57) ABSTRACT

A virtual machine deployment determination unit that manages a plurality of physical machines as machines in which a virtual machine is to be deployed acquires setting information including a type of software that is running on the virtual machine and an operating policy of the software, refers to deployment condition determination information which prescribes a deployment condition for selecting the physical machine to become the deployment destination of the virtual machine is associated with the operating policy of the software and stored therein based on the acquired setting information, and determines the physical machine to become the deployment destination of the virtual machine by selecting the physical machine among the plurality of physical machines based on the referral result.

13 Claims, 20 Drawing Sheets

FIG.4

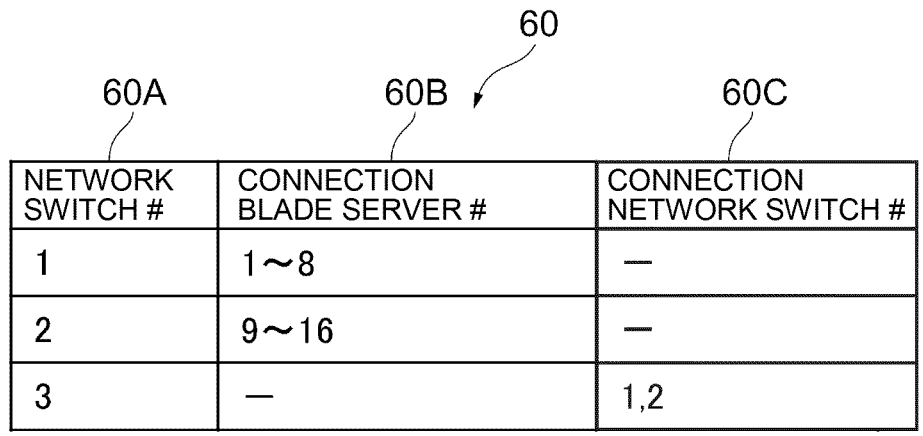

| NETWORK SWITCH # | CONNECTION BLADE SERVER # | CONNECTION NETWORK SWITCH # |
|---|---|---|
| 1 | 1~8 | — |
| 2 | 9~16 | — |
| 3 | — | 1,2 |

FIG.5

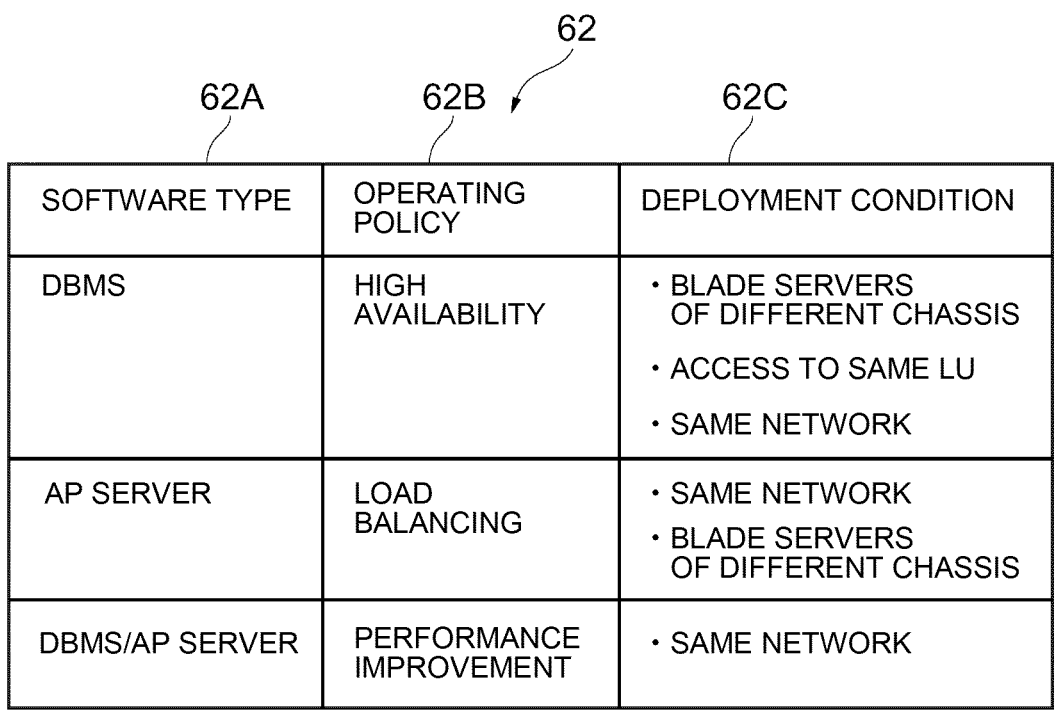

| SOFTWARE TYPE | OPERATING POLICY | DEPLOYMENT CONDITION |
|---|---|---|
| DBMS | HIGH AVAILABILITY | • BLADE SERVERS OF DIFFERENT CHASSIS<br>• ACCESS TO SAME LU<br>• SAME NETWORK |
| AP SERVER | LOAD BALANCING | • SAME NETWORK<br>• BLADE SERVERS OF DIFFERENT CHASSIS |
| DBMS/AP SERVER | PERFORMANCE IMPROVEMENT | • SAME NETWORK |

FIG.18

| SERVER MACHINE # (64A) | ACCESSIBLE STORAGE # (64B) | ACCESSIBLE LU # (64C) |
|---|---|---|
| 1 | 1 | 1,2,3,4 |
| 1 | 2 | 1,2,3,4,5,6,··· |
| 2 | 1 | 1,2,3,4 |
| ⋮ | ⋮ | ⋮ |
| 10 | 2 | 1,2,3,5 |
| 10 | 3 | 1,2,3,4,5,··· |
| ⋮ | ⋮ | ⋮ |
| 16 | 3 | 40,41,42 |

FIG.19

| NETWORK SWITCH # (66A) | CONNECTION SERVER MACHINE # (66B) | CONNECTION NETWORK SWITCH # (66C) |
|---|---|---|
| 1 | 1~8 | — |
| 2 | 9~16 | — |
| 3 | — | 1,2 |

COMPUTER, VIRTUAL MACHINE DEPLOYMENT METHOD AND PROGRAM

TECHNICAL FIELD

The present invention relates to a computer, a virtual machine deployment method and a program for managing deployment of a virtual machine, which is virtualization of hardware of a computer resource, in a physical machine.

BACKGROUND ART

A computer system is configured, for instance, by comprising a storage apparatus, a blade server, and a network. When managing this type of computer system, a scheme is adopted where the service provider or system administrator collectively manages hardware such as the storage apparatus and the blade server, and software such as an OS and middleware, and deploys a virtual machine that is loaded with the OS and the middleware in a physical machine such as the blade server based on the user's request.

When deploying a virtual machine in a physical machine, the physical machine of the deployment destination needs to satisfy the requirements of the virtual machine. At this point, the requirements of the virtual machine may be, for example, the memory size of the memory used by the virtual machine, or the number of cores of the CPU used by the virtual machine.

Upon deploying a virtual machine in a physical machine, proposed is a technology of selecting a physical machine with plenty of resources based on the requirements of the virtual machine, and deploying the virtual machine in the selected physical machine (refer to PTL 1).

Moreover, upon deploying a virtual machine in a physical machine, proposed is a technology of using non-functional requirements such as "mission critical" or "for testing" as the requirements of the virtual machine, selecting a physical machine that satisfies such non-functional requirements, and deploying the virtual machine in the selected physical machine (refer to PTL 2).

CITATION LIST

Patent Literature

[PTL 1]
Japanese Patent Application Publication No. 2011-13822
[PTL 2]
Japanese Patent Application Publication No. 2011-95871

SUMMARY OF INVENTION

Technical Problem

In recent years, there are demands for taking advantage of PaaS (Platform as a Service) also in a so-called mission critical business system having high requirements of performance and reliability. In order to meet such demands, a virtual machine needs to be deployed in a physical machine in a state where the performance and reliability are ensured.

For example, in a business system demanded of high performance and high reliability, a virtual machine needs to be deployed in a physical machine based on the business requirements of the system (mission critical applications and ensurement of performance) and the type of software that is running on the virtual machine. In particular, when deploying a plurality of virtual machines in physical machines, the respective virtual machines need to be deployed in the respective physical machines by giving consideration to the relationship between the respective virtual machines.

However, the conventional technologies give no consideration to the scheme of determining the physical machine to become the deployment destination of the virtual machine based on the business requirements of the system and the type of software that is running on the virtual machine.

In other words, PTL 1 merely describes deploying a single virtual machine in a physical machine with plenty of resources.

Moreover, PTL 2 merely describes deciding in advance, as rules, the physical machine to which the virtual machine is to be deployed for each business requirement, and determining the physical machine to which the virtual machine is to be deployed according to the business requirement. At this point, while PTL 2 adopts a configuration of inputting whether the business service is of a mission critical application, the virtual machine is merely deployed in a highly reliable single physical machine when the business service is of a mission critical application.

In addition, upon deploying a plurality of virtual machines in the respective physical machines, PTL 1 and PTL 2 do not give any consideration to the scheme of determining the physical machines to become the deployment destination of the respective virtual machines based on the type of each of the virtual machines and the operating policy of each type of software.

Solution to Problem

In order to resolve the foregoing problems, one aspect of the present invention aims to provide a computer that manages a plurality of physical machines as the deployment destination of virtual machines, wherein the physical machine to become the deployment destination of the virtual machine is determined by being selected among the plurality of physical machines based on the type of software that is running on the virtual machine and the operating policy of the software.

Advantageous Effects of Invention

According to one aspect of the present invention, it is possible to determine the physical machine to become the deployment destination of the virtual machine based on the type and operating policy of the software that is running on the virtual machine.

BRIEF DESCRIPTION OF DRAWINGS

FIG. 4 is a configuration diagram of the network configuration information in the first embodiment.

FIG. 5 is a configuration diagram of the deployment condition determination information in the first embodiment.

FIG. 18 is a configuration diagram of the disk information in the second embodiment.

FIG. 19 is a configuration diagram of the network configuration information in the second embodiment.

DESCRIPTION OF EMBODIMENTS

An embodiment of the present invention is now explained with reference to the drawings.

First Embodiment

The present embodiment selects, among a plurality of blade servers respectively mounted on a plurality of chassis, the blade server to become the deployment destination of the virtual machine based on the type and operating policy of the software that is running on the virtual machine.

Figure 1:
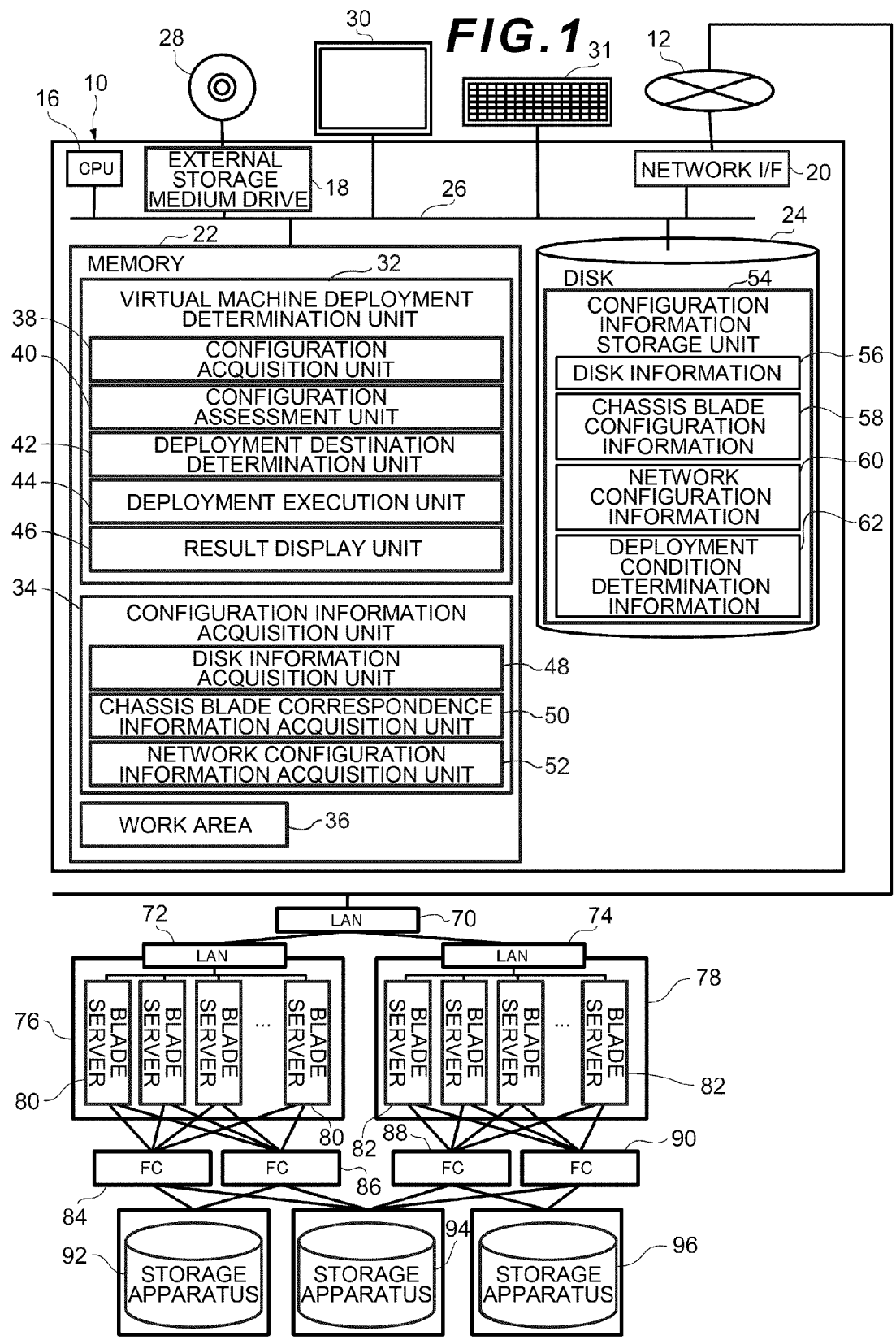
FIG. 1 is a configuration diagram of the computer system in the first embodiment.

FIG. 1 shows a block diagram of the computer system according to the present invention. In FIG. 1, the computer system is configured from a computer 10, a network 12, a plurality of blade servers 80, 82, a plurality of storage apparatuses 92, 94, 96, and the like. The computer 10 is connected to the network 12.

The computer 10 is configured from a CPU 16, an external storage medium drive 18, a network interface 20, a memory 22, and a disk 24, and the respective components are mutually connected via a bus 26.

An external storage medium 28 can be removably loaded in the external storage medium drive 18. As the external storage medium 28, applied may be, for example, an optical recording medium such as a CD or DVD, a magnetic recording medium such as a floppy disk or an HDD, a magneto-optical recording medium such as an MO, or a semiconductor memory such as a flash memory that are compliant with various types of standards.

Moreover, a display device 30 and a keyboard 31 are connected to the bus 26, and the network 12 is connected to the network interface 20.

The memory 22 is a storage unit that configures a program storage area for storing various programs. The memory 22 stores, for example, a virtual machine deployment determination unit 32 and a configuration information acquisition unit 34 as programs, and additionally stores a work area 36 to be used by the CPU 16 for performing arithmetic processing.

The virtual machine deployment determination unit 32 is configured from a configuration acquisition unit 38, a configuration assessment unit 40, a deployment destination determination unit 42, a deployment execution unit 44, and a result display unit 46.

The configuration information acquisition unit 34 is configured from a disk information acquisition unit 48, a chassis blade correspondence information acquisition unit 50, and a network configuration information acquisition unit 52.

The disk 24 is an HDD as an auxiliary storage, and is configured as a storage unit for storing information related to the respective blade servers 80, 82 and storage apparatuses 92, 94, 96.

Specifically, the disk 24 is internally configured with a configuration information storage unit 54, and the configuration information storage unit 54 stores disk information 56, chassis blade correspondence information 58, network configuration information 60, and deployment condition determination information 62.

The disk information 56 is configured from information obtained by the disk information acquisition unit 48 accessing the storage apparatuses 92, 94, 96. The chassis blade correspondence information 58 is configured from information obtained by the chassis blade correspondence information acquisition unit 50 accessing the controller that is built-in the chassis 76, 78. The network configuration information 60 is configured from information obtained by the network configuration information acquisition unit 52 accessing the LAN (Local Area Network) network switches 70, 72, 74.

On an aside, upon storing the various types of information in the disk 24, for example, it is also possible to pre-store, in the external storage medium 28, configuration information including the disk information 56, the chassis blade correspondence information 58 and the network configuration information 60, cause the CPU 16 to read the configuration information from the external storage medium 28 when the external storage medium 28 storing the configuration information is connected to the computer 10, and storing the read configuration information in the disk 24. Moreover, a storage medium such as a memory or SSD (Solid State Drive) may be used in substitute for the disk 24.

The CPU 16 functions as a control unit for governing the overall control of the entire computer 10, and executes the various programs stored in the memory 22; for instance, executes the processing for deploying a virtual machine in a physical machine. At this point, the CPU 16 executes processing for configuring a plurality of virtual machines, which are virtualizations of hardware of computer resources (CPU, memory, I/O interface); that is, virtual machines obtained by databasing (logicalizing) the hardware of computer resources, and deploying (installing) each of the configured virtual machines in the respective physical machines.

The network 12 is connected to a LAN network switch 70, and the LAN network switch 70 is connected to each of the LAN network switches 72, 74. The LAN network switches 70, 72, 74 comprise a plurality of ports, and are configured, for example, from a network switching hub or a router. The LAN network switch 70 is connected to the network 12, the LAN network switch 72 is disposed in the chassis 76 and connected to the LAN network switch 70, and the LAN network switch 74 is disposed in the chassis 78 and connected to the LAN network switch 70.

The LAN network switch 74 forms a path that connects the respective ports in the LAN network switch 74 and the network 12, and forms a path that connects the respective ports in the LAN network switch 74 and the respective ports in the LAN network switches 72, 740. The LAN network switch 72 forms a path that connects the respective ports in the LAN network switch 72 and the respective blade servers 80. The LAN network switch 74 forms a path that connects the respective ports in the LAN network switch 74 and the respective blade servers 82.

The chassis 76 houses a plurality of blade servers 80 as physical machines. Each blade server 80 is connected to the LAN network switch 72, and additionally connected to the FC (Fibre Channel) network switches 84, 86. Note that the chassis 76 has a built-in controller for managing the chassis 76 and the respective blade servers 80. Moreover, the chassis 78 is configured in the same manner as the chassis 76.

The FC network switches 84, 86 comprise a plurality of ports, and are connected to the storage apparatuses 92, 94. At this point, the FC network switches 84, 86 form a path that connects the respective blade servers 80 and the storage apparatus 92 via the respective ports, and additionally form a path that connects the respective blade servers 80 and the storage apparatus 94 via the respective ports. The FC network switches 88, 90 are configured in the same manner as the FC network switches 84, 86, and form a path that connects the respective blade servers 82 and the storage apparatus 94 via the respective ports, and additionally form a path that connects the respective blade servers 82 and the storage apparatus 96 via the respective ports.

The storage apparatuses 92, 94, 96 are configured from a plurality of storage devices; for instance, from a plurality of HDDs. When a hard disk device is to be used as the storage device, for instance, a SCSI (Small Computer System Interface) disk, a SATA (Serial ATA) disk, an ATA (AT Attachment) disk, a SAS (Serial Attached SCSI) disk or the like may be used.

When a semiconductor memory device is to be used as the storage device, an SSD, a FeRAM (Ferroelectric Random Access Memory), an MRAM (Magnetoresistive Random Access Memory), a phase-change memory (Ovonic Unified Memory), an RRAM (Resistance Random Access Memory) (registered trademark) or the like may be used.

Moreover, it is also possible to configure a RAID (Redundant Array of Inexpensive Disks) group such as RAID 4, RAID 5, or RAID 6 with the respective storage devices, or divide the respective storage devices into a plurality of RAID groups. At this point, it is also possible to form a plurality of logical units (hereinafter sometimes referred to as "LUs (Logical Units)") or a plurality of logical volumes on a physical storage area of the respective storage devices.

An LU is a logical unit that is provided to the computer 10 from the blade server 80 or the blade server 82 as an access target of the computer 10.

An LUN (Logical Unit Number) is assigned as an identifier to the LU, and a logical block address LBA (Logical Block Address) is assigned to each segment. At this point, the computer 10 can access the data stored in the storage area corresponding to the LU by sending a logical address configured from the identifier LUN and the logical block address LBA to the blade server 80 or the blade server 82.

At this point, the respective blade servers 80, 82 are configured as physical machines that control the I/O of data to and from the storage apparatuses 92, 94, 96 via the FC network switches 84, 86 or the FC network switches 88, 90.

Note that, upon connecting the computer 10 to the respective storage apparatuses 92, 94, 96 and the like, it is also possible to mutually connect the computer 10 and the chassis 76, 78 or mutually connect the computer 10 and the respective FC network switches 84, 86, 88, 90 so that the computer 10 can directly collect information of the chassis 76, 78 or the respective storage apparatuses 92, 94, 96. In addition, it is also possible to mutually connect the computer 10 and the respective storage apparatuses 92, 94, 96.

At this point, the computer 10 sends and receives information to and from an agent (for instance, a management module that is realized through the cooperation of the CPU and the programs) that is disposed in the respective LAN network switches 70, 72, 74, respective chassis 76, 78, respective FC network switches 84, 86, 88, 90, and respective storage apparatuses 92, 94, 96.

Figure 2:
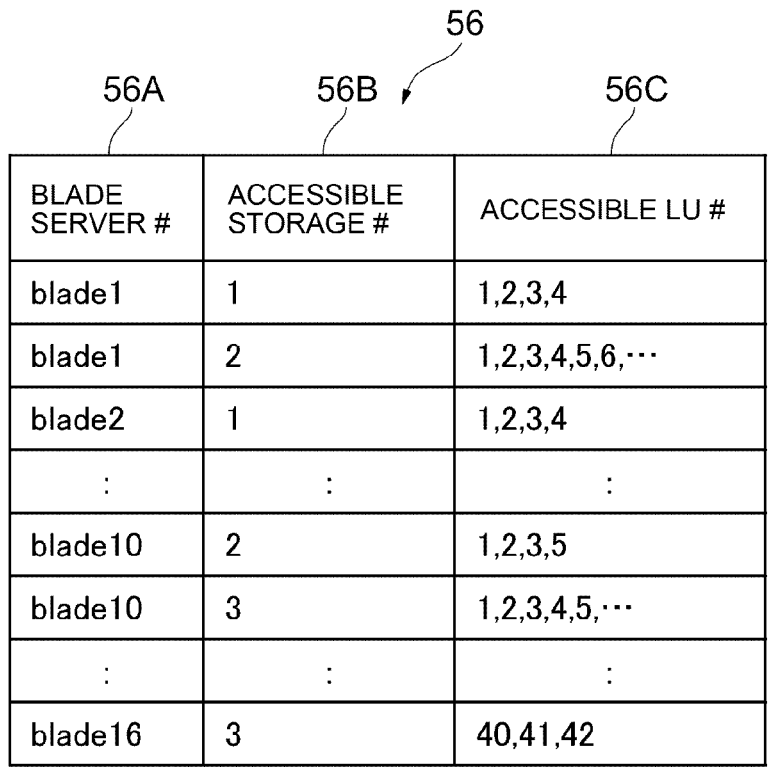
FIG. 2 is a configuration diagram of the disk information in the first embodiment.

FIG. 2 shows a configuration diagram of the disk information. In FIG. 2, the disk information 56 is information for managing the storage apparatuses and logical units (LUs) that are accessible by the respective blade servers 80, 82, and is configured from a blade server number 56A, an accessible storage number 56B, and an accessible LU number 56C. Note that the disk information 56 may also be used as information that includes shared disk information.

The blade server number 56A is an identifier for uniquely identifying the respective blade servers 80, 82. Each entry of the blade server number 56A stores an identifier for identifying the respective blade servers 80, 82. For example, as an identifier for identifying the #1 blade server 80, "blade 1" is stored in the first entry of the blade server number 56A.

The accessible storage number 56B is a number for identifying the storage apparatus that is accessible by the respective blade servers 80, 82. Each entry of the accessible storage number 56B stores a number for identifying the storage apparatuses 92, 94, 96. For example, when the storage apparatuses 92, 94, 96 are respectively named the #1 to #3 storage apparatuses, in the entry of the accessible storage number 56B, "1" is stored as the number for identifying the storage apparatus 92, "2" is stored as the number for identifying the storage apparatus 94, and "3" is stored as the number for identifying the storage apparatus 96.

The accessible LU number 56C is the number of the LU that is accessible by the respective blade servers 80, 82. Each entry of the accessible LU number 56C stores the number of the LU that is accessible by the respective blade servers 80, 82. For example, when the #1 blade server 80 can access the #1 to #4 LUs, "1, 2, 3, 4" is stored in the first entry of the accessible LU number 56C.

On an aside, in the disk information 56, it is also possible to associate the connection relation of the respective blade servers 80, 82 and the respective FC network switches 84, 86, 88, 90 with the respective LUs and register the association, and associate the connection relation of the respective FC network switches 84, 86, 88, 90 and the respective storage apparatuses 92, 94, 96 with the respective LUs and register the association.

Figure 3:
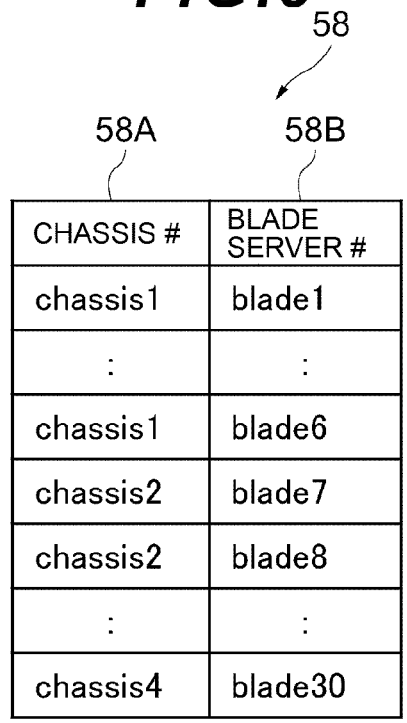
FIG. 3 is a configuration diagram of the chassis blade correspondence information in the first embodiment.

FIG. 3 shows a configuration diagram of the chassis blade correspondence information. In FIG. 3, the chassis blade correspondence information 58 is information for managing the relation of the respective chassis 76, 78 and the respective blade servers 80, 82, and is configured from a chassis number 58A, and a blade server number 58B.

The chassis number 58A is an identifier for identifying the chassis 76, 78. Each entry of the chassis number 58A stores an identifier for identifying the chassis 76, 78. For example, when the chassis 76 is named the #1 chassis, "chassis 1" is stored in the first entry of the chassis number 58A.

The blade server number 58B is an identifier for identifying the respective blade servers 80, 82. Each entry of the blade server number 58A stores an identifier for identifying the respective blade servers 80, 82. For example, when the #1 blade server 80 is housed in the #1 chassis 76, "blade 1" is stored in the first entry of the blade server number 58B.

FIG. 4 shows a configuration diagram of the network configuration information. In FIG. 4, the network configuration information 60 is information for managing the connection relationship of the computer 10 and the respective blade servers. Specifically, the network configuration information 60 is information for managing the connection relationship of the respective LAN network switches 70, 72, 74 and the respective blade servers 80, 82 among the devices existing between the computer 10 and the respective blade servers, and is configured from a network switch number 60A, a connection blade server number 60B, and a connection network switch number 60C. At this point, a network switch refers to a device such as a network switching hub or a router for connecting the network lines.

The network switch number 60A is a number for uniquely identifying the LAN network switches 70, 72, 74. Each entry of the network switch number 60A stores a number for identifying the respective LAN network switches 70, 72, 74. For example, when the LAN network switch 72 is the #1 network switch, the LAN network switch 74 is the #2 network switch, and the LAN network switch 70 is the #3 network switch, "1" is stored in the first entry of the network switch number 60A as the number for identifying the LAN network switch 72, "2" is stored in the second entry of the network switch number 60A as the number for identifying the LAN network switch 74, and "3" is stored in the third entry of the network switch number 60A as the number for identifying the LAN network switch 70.

The connection blade server number 60B is a number for identifying the blade servers 80, 82 that are connected to the respective LAN network switches 70 to 74.

Each entry of the connection blade server number 60B stores a number for identifying the blade servers 80, 82 that are connected to the respective LAN network switches 70 to 74. For example, when the #1 to #8 blade servers 80 are connected to the LAN network switch 72, "1 to 8" is stored in the first entry of the connection blade server number 60B.

Note that, since the LAN network switch 70 is not connected to the blade servers 80, 82, "–" is stored in the third entry of the connection blade server number 60B.

The connection network switch number 60C is a number for identifying the connection relationship between the respective LAN network switches 70, 72, 74. Each entry of the connection network switch number 60C stores a number of the LAN network switch that is connected to the respective LAN network switches 70, 72, 74. For example, when the #3 LAN network switch 70 is connected to each of the LAN network switches 72, 74, "1, 2" is stored in the third entry of the connection network switch number 60C.

Moreover, it is also possible to associate the connection relationship of the respective blade servers 80, 82 and the respective LAN network switches 70, 72, 74 with the network 12 connecting the respective blade servers 80, 82 and the computer 10, and store the association in the network configuration information 60. In the foregoing case, for example, it is possible to select the blade servers that are connected to the same network 12 among the plurality of blade servers 80, 82 by referring to the network configuration information 60.

In addition, it is possible to associate the connection relationship of the respective blade servers 80, 82 and the respective LAN network switches 70, 72, 74 with the network 12 connecting the respective blade servers 80, 82 and the computer 10, and store the association in the network configuration information 60, as well as store physical machine information for identifying the blade servers that are disposed adjacent to each other in the network configuration information 60.

In the foregoing case, it is possible to select the blade servers that are connected to the same network 12 and the blade servers that are disposed adjacent to each other among the plurality of blade servers 80, 82 by referring to the network configuration information 60.

FIG. 5 shows a configuration diagram of the deployment condition determination information. In FIG. 5, the deployment condition determination information 62 is information for managing the type, operating policy and deployment condition of the software that is running on the virtual machine, and is configured from a software type 62A, an operating policy 62B, and a deployment condition 62C.

The software type 62A is information for identifying the type of software that is running on the virtual machine.

Each entry of the software type 62A stores information for identifying the type of software that is running on the virtual machine.

For example, when the type of software running on the virtual machine is "DBMS (Database Management System)", "DBMS" is stored in the entry of the software type 62A. When the type of software running on the virtual machine is "AP (Application) server", "AP server" is stored in the entry of the software type 62A.

Meanwhile, when the type of software running on the virtual machine includes both "DBMS" and "AP server", "DBMS/AP server" is stored in the entry of the software type 62A.

The operating policy 62B is information relating to the operating policy of the software that is running on the virtual machine.

Each entry of the operating policy 62B stores information related to the operating policy of the software that is running on the virtual machine. For example, when the operating policy of the software that is running on the virtual machine is "High Availability", information of "High Availability" is stored in the entry of the software type 62A. Note that, as specific examples of High Availability, there are, for instance, the system switchover configuration and the redundancy of the system.

Meanwhile, when the operating policy of the software that is running on the virtual machine is "Load Balancing", information of "Load Balancing" is stored in the entry of the software type 62A, and when the operating policy of the software that is running on the virtual machine is "performance improvement", information of "performance improvement" is stored in the entry of the software type 62A.

The deployment condition 62C is information for prescribing the deployment condition(s) of the physical machines to become the deployment destination of the virtual machine.

In each entry of the deployment condition 62C, information related to the deployment condition(s) of the physical machines to become the deployment destination of the virtual machine is associated with the operating policy 62B, and stored.

For example, when the operating policy 62B is "High Availability" and the deployment of a plurality of virtual machines in a plurality of physical machines is the deployment condition; specifically, when the blade servers existing on different chassis that are connected to the same network and which can access the same LU becoming the physical machines of the deployment destination is the deployment condition, information of "Blade servers of different chassis, Access to same LU, Same network" is stored in the entry of the deployment condition 62C.

Moreover, when the operating policy 62B is "Load Balancing" and the deployment of a plurality of virtual machines in a plurality of physical machines and the load balancing of the respective physical machines is the deployment condition; specifically, when the blade servers existing on different chassis that are connected to the same network becoming the physical machines of the deployment destination is the deployment condition, information of "Blade servers of different chassis, Same network" is stored in the entry of the deployment condition 62C.

Meanwhile, when the operating policy 62B is "performance improvement", and the deployment of a plurality of virtual machines in a plurality of physical machines is required as the deployment condition; specifically, when the blade servers that are connected to the same network becoming the physical machines of the deployment destination is the deployment condition, information of "Same network" is stored in the entry of the deployment condition 62C.

In addition, when the blade servers that are connected to the same network and the blade servers that are disposed adjacent to each other are the deployment condition, information of "Same network, Blade servers disposed adjacent to each other" is stored in the entry of the deployment condition 62C.

Moreover, when a blade server capable of ensuring a monitoring path and a reset path is the deployment condition, information of "Blade server capable of ensuring monitoring path and reset path" is stored in the entry of the deployment condition 62C.

Figure 6:
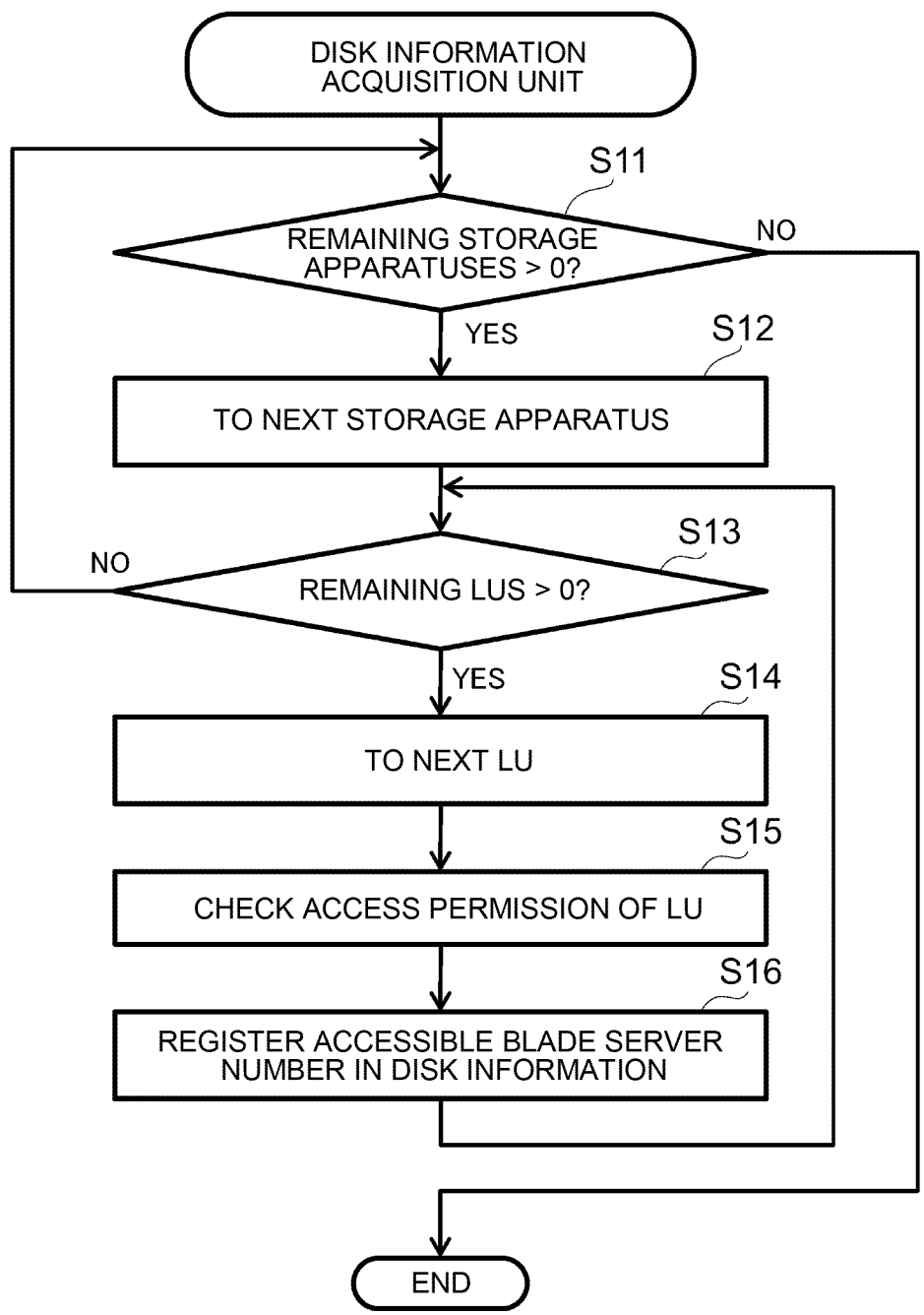
FIG. 6 is a flowchart explaining the processing performed by the disk information acquisition unit in the first embodiment.

The processing performed by the disk information acquisition unit 48 is explained with reference to the flowchart shown in FIG. 6. This processing is started by the CPU 16 activating the disk information acquisition unit 48.

The disk information acquisition unit 48 executes processing for sequentially searching the storage apparatuses 92, 94, 96, checking which blade server can access the LU in the respective storage apparatuses, and registering the check result in the disk information 56.

Specifically, the disk information acquisition unit 48 determines, in the course of sequentially searching the respective storage apparatuses 92, 94, 96, whether the number of remaining storage apparatuses is greater than 0 (S11).

When it is determined that the number of remaining storage apparatuses is smaller than 0 in Step S11, since there are no remaining storage apparatuses to be searched, the disk information acquisition unit 48 ends the processing with this routine.

Meanwhile, when it is determined that the number of remaining storage apparatuses is greater than 0 in Step S11, the disk information acquisition unit 48 executes processing for searching the next storage apparatus (S12). For example, in the case of sequentially searching the #1 to #3 storage apparatuses 92, 94, 96, the disk information acquisition unit 48 searches the #1 storage apparatus 92, thereafter searches the #2 storage apparatus 94, and thereafter searches the #3 storage apparatus 96.

Subsequently, the disk information acquisition unit 48 determines whether the remaining number of LUs to be checked, among the LUs existing in the storage apparatus to be searched, is greater than 0 (S13).

When a negative determination result is obtained in Step S13, since there are no remaining LUs to be checked among the LUs existing in the storage apparatus to be searched, the disk information acquisition unit 48 returns to the processing of Step S11, and repeats the processing of Step S11 to Step S13.

Meanwhile, when a positive determination result is obtained in Step S13, since there is a remaining LU to be checked among the LUs existing in the storage apparatus to be searched, the disk information acquisition unit 48 executes processing for selecting the next LU (S14).

In Step S14, the disk information acquisition unit 48 executes processing for sequentially selecting the LUs existing in the storage apparatus to be searched.

Subsequently, the disk information acquisition unit 48 checks the access permission of the selected LU (S15). Specifically, the disk information acquisition unit 48 makes an inquiry to the storage apparatus to be searched with regard to which blade server can access the selected LU.

Subsequently, the disk information acquisition unit 48 registers, in the disk information 56, the blade server number of the blade server 80 or the blade server 82 as the blade server number of the blade server that can access the selected LU based on the information obtained from the storage apparatus to be searched (S16), thereafter returns to the processing of Step S13, and then repeats the processing of Step S13 to Step S16.

The disk information acquisition unit 48 thereafter checks which blade server can access the respective LUs with regard to all LUs existing in the respective storage apparatuses 92, 94, 96, registers the respective check results in the disk information 56, and then ends the processing with this routine.

Figure 7:
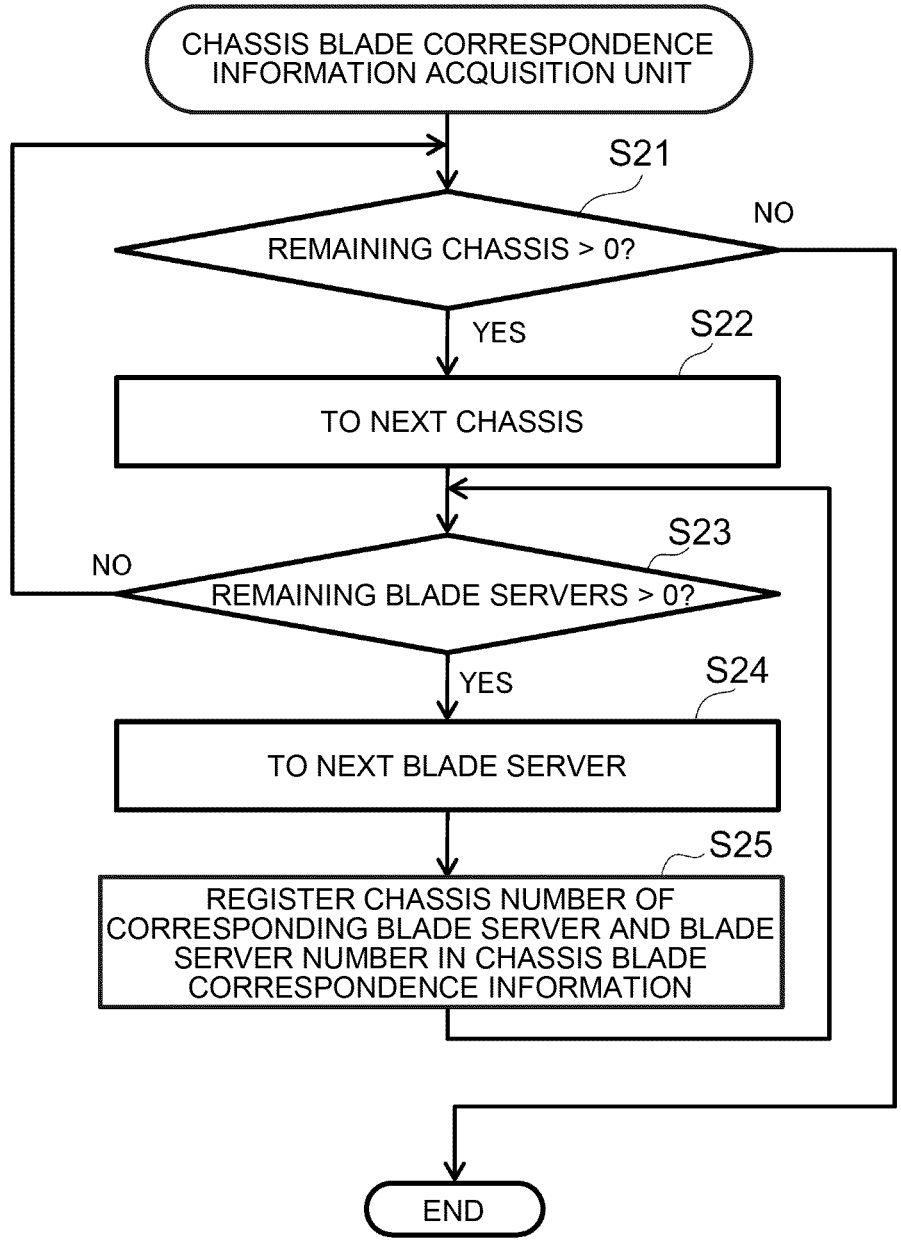
FIG. 7 is a flowchart explaining the processing performed by the chassis blade correspondence information acquisition unit in the first embodiment.

The processing performed by the chassis blade correspondence information acquisition unit 50 is now explained with reference to the flowchart shown in FIG. 7. This processing is started by the CPU 16 activating the chassis blade correspondence information acquisition unit 50.

The chassis blade correspondence information acquisition unit 50 executes processing for sending and receiving information to and from the agents disposed in the respective chassis 76, 78, thereby sequentially checking the blade server number of the blade server 80 mounted on the chassis 76 and the blade server number of the blade server 82 mounted on the chassis 78, and registering the check results in the chassis blade correspondence information 58.

Specifically, the chassis blade correspondence information acquisition unit 50 determines, in the course of sequentially searching the chassis 76, 78, whether the remaining number of chassis is greater than 0 (S21).

When a positive determination result is obtained in Step S21, since there is a remaining chassis to be searched, the chassis blade correspondence information acquisition unit 50 executes processing for searching the next chassis as the chassis to be searched (S22).

Meanwhile, when a negative determination result in Step S21, since there is no remaining chassis to be searched, the chassis blade correspondence information acquisition unit 50 ends the processing with this routine.

In Step S22, the chassis blade correspondence information acquisition unit 50 searches the chassis 76, and thereafter searches the chassis 78.

Subsequently, the chassis blade correspondence information acquisition unit 50 determines whether the number of remaining blade servers to be checked in the chassis 76 or the chassis 78 is greater than 0 (S23).

When the chassis blade correspondence information acquisition unit 50 obtains a negative determination result in Step S23, since there is no remaining blade server to be checked in the chassis to be searched, the chassis blade correspondence information acquisition unit 50 returns to the processing of Step S21, and then repeats the processing of Step S21 to Step S23.

Meanwhile, when the chassis blade correspondence information acquisition unit 50 obtains a positive determination result in Step S23, since there is a remaining blade server to be checked in the chassis to be searched, the chassis blade correspondence information acquisition unit 50 executes processing for checking the next blade server (S24).

In Step S24, the chassis blade correspondence information acquisition unit 50 executes processing for sequentially selecting the blade server 80 existing in the chassis 76 or the blade server 82 existing in the chassis 78.

Subsequently, the chassis blade correspondence information acquisition unit 50 registers, in the chassis blade correspondence information 58, the chassis number of the chassis mounted with the selected blade server, and the blade server number of the selected blade server (S25), returns to the processing of Step S23, and repeats the processing of Step S23 to Step S25 until all blade servers are selected.

In Step S25, the chassis blade correspondence information acquisition unit 50 registers the chassis number of the chassis 76 and the blade server number of the blade server 80 in the chassis blade correspondence information 58 when, for example, the blade server 80 is mounted on the chassis 76.

The chassis blade correspondence information acquisition unit 50 thereafter executes processing for registering, in the chassis blade correspondence information 58, the chassis number and the blade server number with regard to all blade servers 80, 82 that are mounted on the chassis 76, 78, and then ends the processing with this routine.

Figure 8:
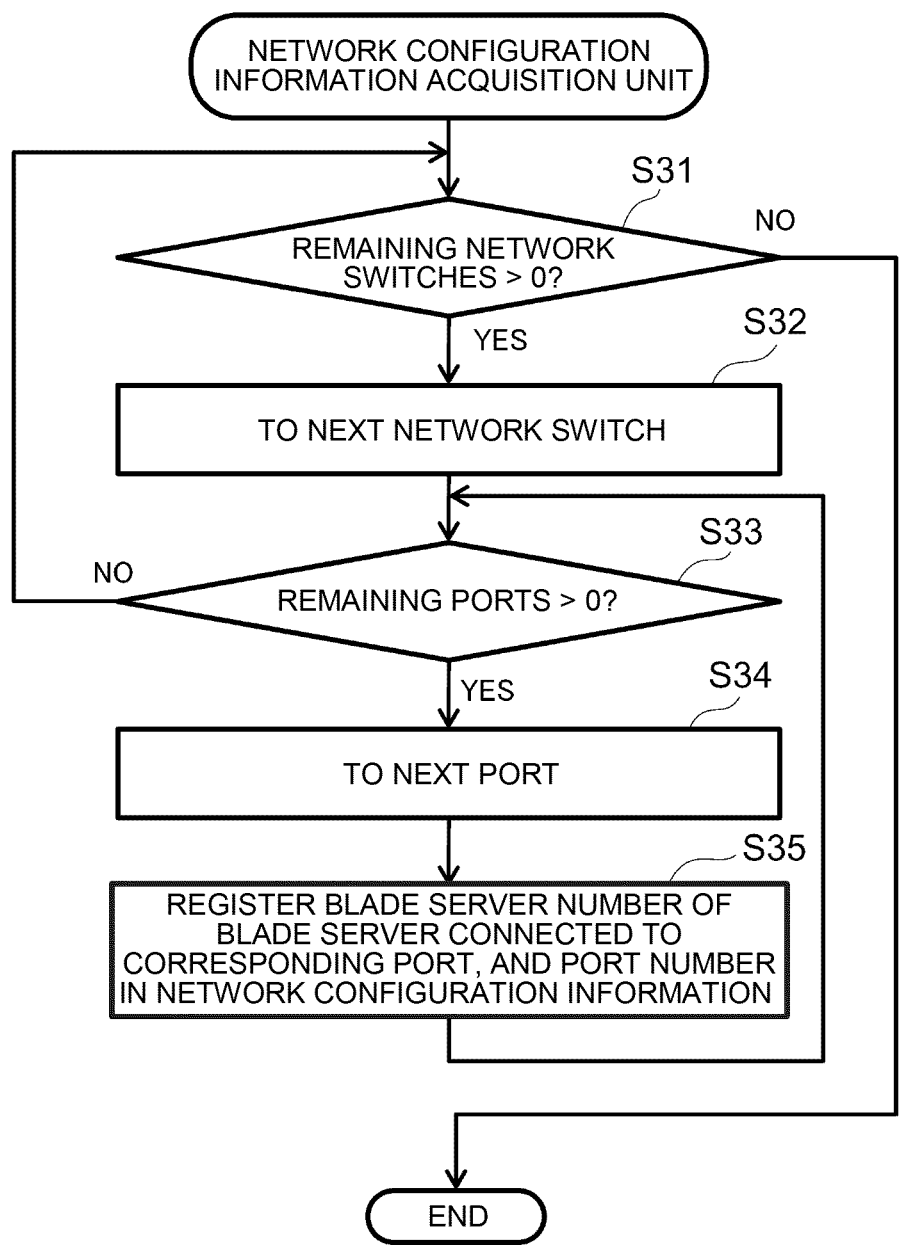
FIG. 8 is a flowchart explaining the processing performed by the network configuration information acquisition unit in the first embodiment.

The processing performed by the network configuration information acquisition unit 52 is now explained with reference to the flowchart shown in FIG. 8. This processing is started by the CPU 16 activating the network configuration information acquisition unit 52.

The network configuration information acquisition unit 52 executes processing for sending and receiving information to and from the respective agents existing in the LAN network switches 70, 72, 74, checking the blade server number of the blade servers that are connected to the ports of the respective LAN network switches 70, 72, 74, and registering the check results in the network configuration information 60.

Specifically, the network configuration information acquisition unit 52 determines, in the course of sequentially searching the LAN network switches 70, 72, 74, whether the number of remaining network switches to be searched is greater than 0 (S31).

When the network configuration information acquisition unit 52 obtains a positive determination result in Step S31, since there is a remaining network switch to be searched, the network configuration information acquisition unit 52 executes processing for selecting the next network switch (S32). In step 32, the network configuration information acquisition unit 52 executes processing for sequentially selecting the LAN network switches 70, 72, 74 to be searched.

Meanwhile, when the network configuration information acquisition unit 52 obtains a negative determination result in Step S31, since there are no remaining network switches to be searched, the network configuration information acquisition unit 52 ends the processing with this routine.

Subsequently, the network configuration information acquisition unit 52 determines whether the number of remaining ports to be checked in the selected LAN network switch is greater than 0 (S33).

When the network configuration information acquisition unit 52 obtains a negative determination result in Step S33, since there are no remaining ports to be checked in the selected LAN network switch, the network configuration information acquisition unit 52 returns to the processing of Step S31. Meanwhile, when the network configuration information acquisition unit 52 obtains a positive determination result in Step S33, since there is a remaining port to be checked in the selected LAN network switch, the network configuration information acquisition unit 52 executes processing for selecting the next port (S34).

In Step S34, the network configuration information acquisition unit 52 executes processing for sequentially selecting the ports to be checked that exist in the selected LAN network switch to be searched.

Subsequently, the network configuration information acquisition unit 52 registers, in the network configuration information 60, the blade server number of the blade server 80 or the blade server 82 that is connected to the selected port to be checked, and the port number of the selected port to be checked (335), and then returns to the processing of Step S33.

The network configuration information acquisition unit 52 thereafter executes processing for associating, with regard to all ports existing in the respective LAN network switches 70, 72, 74, the blade server number of the blade server 80 or the blade server 82 connected to the respective ports and the port number of the respective ports connected to the blade server 80 or the blade server 82 with the respective LAN network switches 70, 72, 74, and registering the association in the network configuration information 60, and then ends the processing with this routine.

Figure 9:
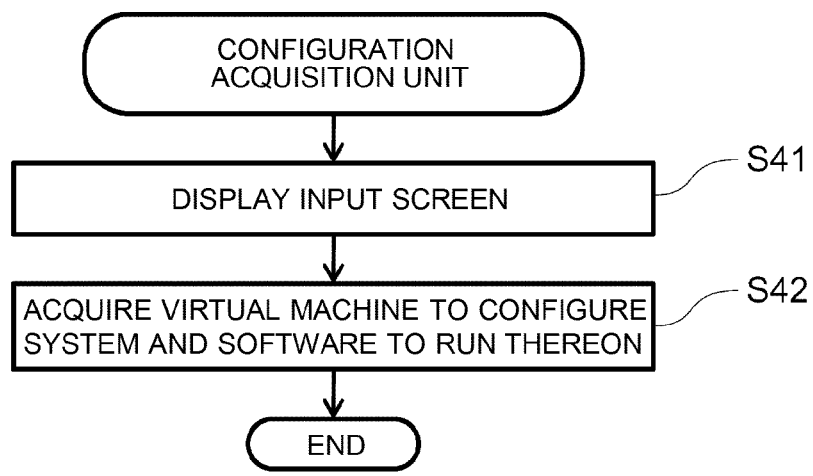
FIG. 9 is a flowchart explaining the processing performed by the configuration acquisition unit in the first embodiment.

The processing performed by the configuration acquisition unit 38 is now explained with reference to the flowchart shown in FIG. 9. This processing is started by the CPU 16 activating the configuration acquisition unit 38.

The configuration acquisition unit 38 executes processing for displaying an input screen on a screen of the display device 30 based on the operation information from the keyboard 31 (S41).

Subsequently, the configuration acquisition unit 38 acquires information based on the operation of the keyboard 31 when the keyboard 31 is operated in connection with the input screen displayed on the screen of the display device 30. For example, the configuration acquisition unit 38 acquires information related to the virtual machines configuring the system and the software running on the virtual machines based on the operation of the keyboard 31 (S42), and then ends the processing with this routine.

In Step S42, when the configuration acquisition unit 38 acquires setting information including the type of software that is running on the virtual machine and the operating policy of the software, the configuration acquisition unit 38 associates the acquired setting information with deployment information, and registers the association in the deployment condition determination information 62.

Figure 10:
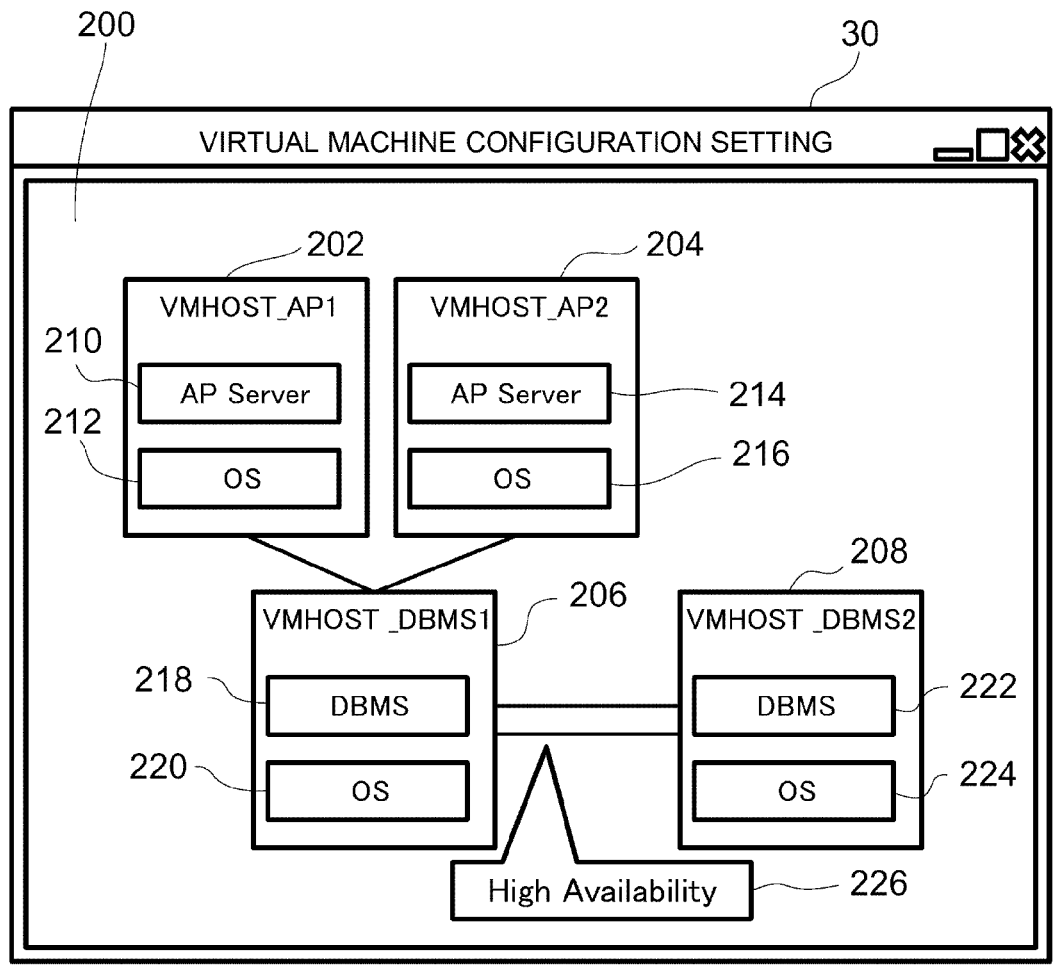
FIG. 10 is a diagram showing a display example of the configuration input screen.

FIG. 10 shows a display example of the input screen that is displayed on the screen of the display device 30. In FIG. 10, when the user uses the keyboard 31 and performs operations for configuring four virtual machines, displayed on the input screen 200 for the virtual machine configuration setting are, for example, four virtual machines 202, 204, 206, 208 based on the operation information of the keyboard 31.

The virtual machine 202 is configured from an AP server 210, and an OS 212, and the virtual machine 204 is configured from an AP server 214, and an OS 216.

In the foregoing case, the virtual machine 202 uses the AP server 210 and the OS 212 as the software that is running on the virtual machine 202, and the type of software of the virtual machine 202 has been set as the AP server.

Moreover, the virtual machine 204 uses the AP server 214 and the OS 216 as the software that is running on the virtual machine 204, and the type of software of the virtual machine 204 has been set as the AP server.

At this point, when the operating policy of the virtual machines 202, 204 is set, for example, to "Load Balancing", and the virtual machines 202, 204 need to be deployed in parallel in the respective physical machines, the CPU 16 manages the deployment condition of the virtual machines 202, 204 as "Blade servers of different chassis, Same network".

Moreover, when the virtual machine 206 is set as the virtual machine for storing the data of the respective virtual machines 202, 204, the virtual machines 202, 204 are displayed in a state of being respectively connected to the virtual machine 206.

The virtual machine 206 is configured from a DBMS 218, and an OS 220, and the virtual machine 208 is configured from a DBMS 222, and an OS 224.

In the foregoing case, the virtual machine 206 uses the DBMS 218 and the OS 220 as the software that is running on the virtual machine 206, and the type of software of the virtual machine 206 is set as the DBMS. The virtual machine 208 uses the DBMS 222 and the OS 224 as the software that is running on the virtual machine 208, and the type of software of the virtual machine 208 is set as the DBMS.

At this point, when High Availability 226 is set as the operating policy of the virtual machine 206 and the virtual machine 208, for example, the virtual machine 206 and the virtual machine 208 are displayed in a state of being connected to each other so as to form a system switchover configuration. Moreover, the CPU 16 manages the deployment condition of the virtual machines 206, 208 as "Blade servers of different chassis, Access to same LU, Same network".

Figure 11:
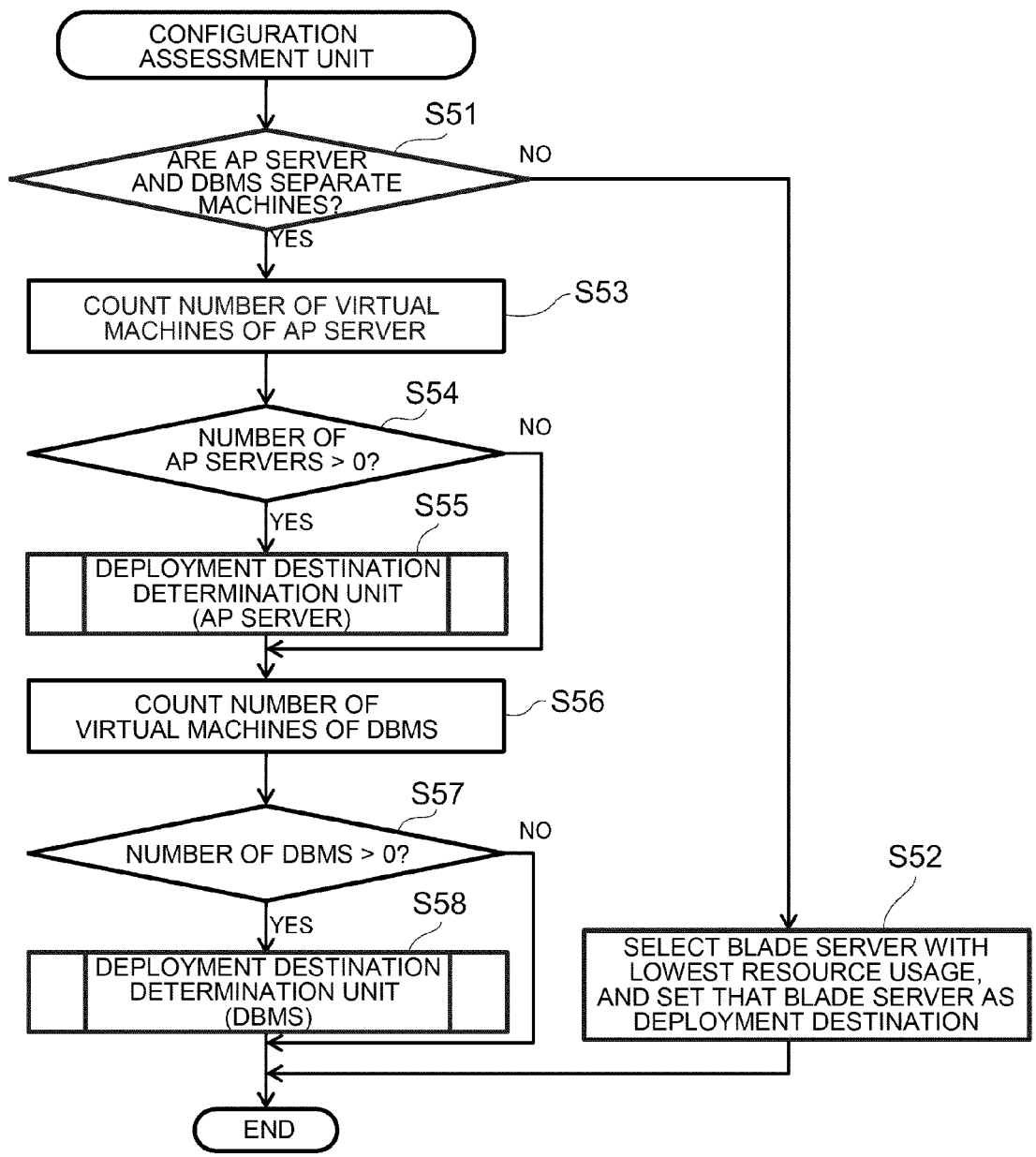
FIG. 11 is a flowchart explaining the processing performed by the configuration assessment unit in the first embodiment.

The processing performed by the configuration assessment unit 40 is now explained with reference to the flowchart shown in FIG. 11. This processing is started by the CPU 16 executing the configuration assessment unit 40.

Upon deploying a plurality of virtual machines in the respective physical machines, the configuration assessment unit 40 foremost accesses information that was input to the configuration acquisition unit 38 or information that was transferred from the configuration acquisition unit 38 to the work area 36, and determines whether the AP server and the DBMS exist in separate machines; that is, in separate virtual machines (S51).

When a negative determination result is obtained in Step S51; that is, when it is determined that the AP server and the DBMS exist in the same virtual mine, the configuration assessment unit 40 selects the blade server with the minimum resource usage among the plurality of blade servers 80, 82, determines the selected blade server as the deployment destination of the virtual machine (S52), and ends the processing with this routine.

Meanwhile, when a positive determination result is obtained in Step S51; that is, when the AP server and the DBMS respectively exist in separate virtual machines, the configuration assessment unit 40 counts the number of virtual machines in which the AP server exists (S53), and determines whether the number of AP servers is greater than 0 based on the count value (S54).

When the configuration assessment unit 40 obtains a negative determination result in Step S54, since there is no AP server in the virtual machine to be subject to determination, the configuration assessment unit 40 proceeds to the processing of Step S56. Meanwhile, when the configuration assessment unit 40 obtains a positive determination result in Step S54, since there is an AP server in the virtual machine to be subject to determination, the configuration assessment unit 40 proceeds to the processing performed by the deployment destination determination unit 42 (S55).

Note that, in Step S53, when the virtual machines 202, 204, 206, 208 become the virtual machines to be subject to determination, the configuration assessment unit 40 counts the number of virtual machines 202, 204 loaded with the AP servers 210, 214 as two.

In Step S55, the deployment destination determination unit 42 executes processing for deploying the virtual machine 202 loaded with the AP server 210 and the virtual machine 204 loaded with the AP server 214 in the blade server 80 or the blade server 82, respectively.

Subsequently, the configuration assessment unit 40 counts the number of virtual machines loaded with the DBMS (S56), and determines whether the number of DBMS is greater than 0 based on the count value (S57).

When the configuration assessment unit 40 obtains a negative determination result in Step S57, since no DBMS exists in the virtual machine to be subject to determination, the configuration assessment unit 40 ends the processing with this routine. Meanwhile, when the configuration assessment unit 40 obtains a positive determination result in Step S57, since a DBMS exists in the virtual machine to be subject to determination, the configuration assessment unit 40 proceeds to the processing performed by the deployment destination determination unit 42 (S58), and thereafter ends the processing with this routine.

On an aside, in Step S56, when the virtual machines 202, 204, 206, 208 become the virtual machines to be subject to determination, the configuration assessment unit 40 counts the number of virtual machines 206, 208 loaded with the DBMS 218, 222 as two.

Moreover, in Step S58, the deployment destination determination unit 42 executes processing for deploying the virtual machine 206 in which the DBMS 218 exists and the virtual machine 208 in which the DBMS 222 exists in the blade server 80 or the blade server 82, respectively.

Figure 12:
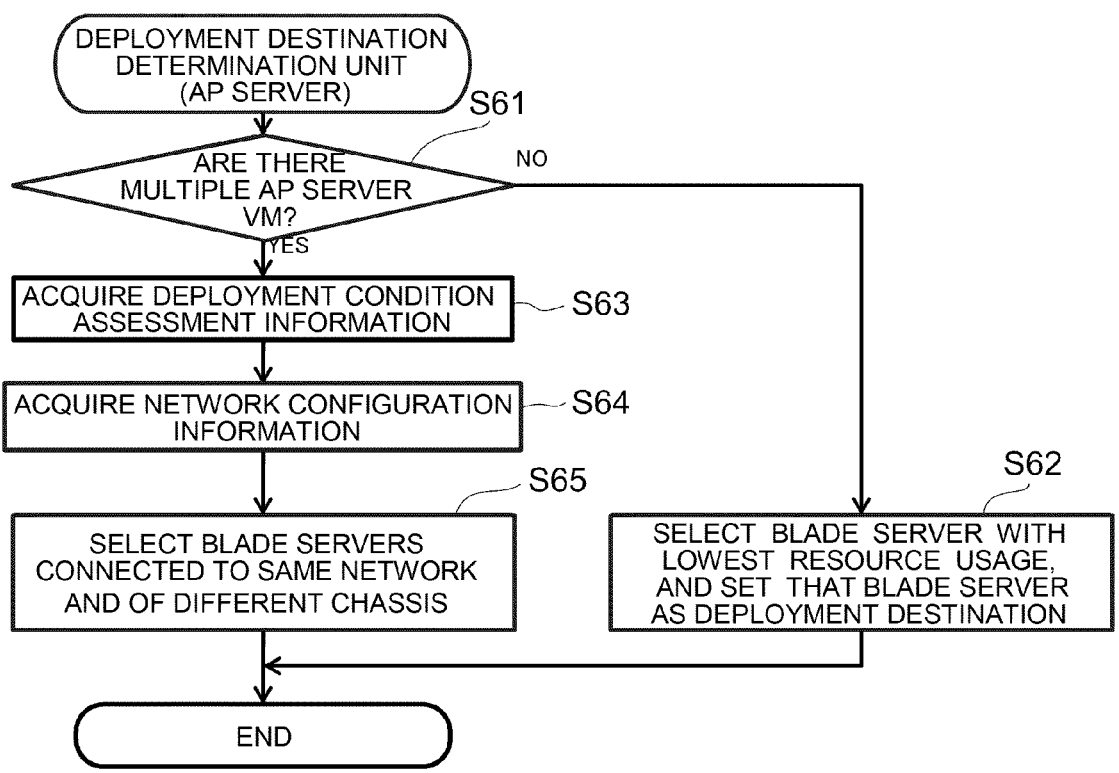
FIG. 12 is a flowchart explaining the processing performed by the deployment destination determination unit in the first embodiment.

The processing performed by the deployment destination determination unit 42 is now explained with reference to the flowchart shown in FIG. 12. This processing is the specific contents of Step S55 of FIG. 11, and is started by the CPU 16 activating the deployment destination determination unit 42.

The deployment destination determination unit 42 determines whether there are multiple AP servers based on the assessment result of the configuration assessment unit 42 (S61). In other words, the deployment destination determination unit 42 determines whether there are a plurality of virtual machines that are loaded with the AP server.

When a negative determination result is obtained in Step S61; that is, when it is determined that one virtual machine is loaded with the AP server, the deployment destination determination unit 42 selects the blade server with the minimal resource usage among the plurality of blade servers 80, 82, sets the selected blade server as the deployment destination of the virtual machine (S62), and then ends the processing with this routine.

Meanwhile, when a positive determination result is obtained in Step S61, the deployment destination determination unit 42 executes processing for acquiring the deployment condition determination information 62 (S63), and thereafter executes processing for acquiring the network configuration information 60 (S64).

Subsequently, the deployment destination determination unit 42 refers to the acquired deployment condition determination information 62 and the acquired network configuration information 60, selects two blade servers that exist on the same network and exist on different chassis (S65), and then ends the processing with this routine.

In Step S65, when the type of software loaded in the virtual machines 202, 204 is "AP server" and the operating policy is "Load Balancing", the deployment destination determination unit 42 selects the blade servers on the same network as the deployment condition. In the foregoing case, one blade server 80 is selected from the chassis 76 and one blade server 82 is selected from the chassis 78 are selected as the blade servers connected to the same network 12 so as to balance the load. Note that, when the operating policy is "Load Balancing", it is also possible to select two blade servers existing in the same chassis as the blade servers connected to the same network 12.

Figure 13:
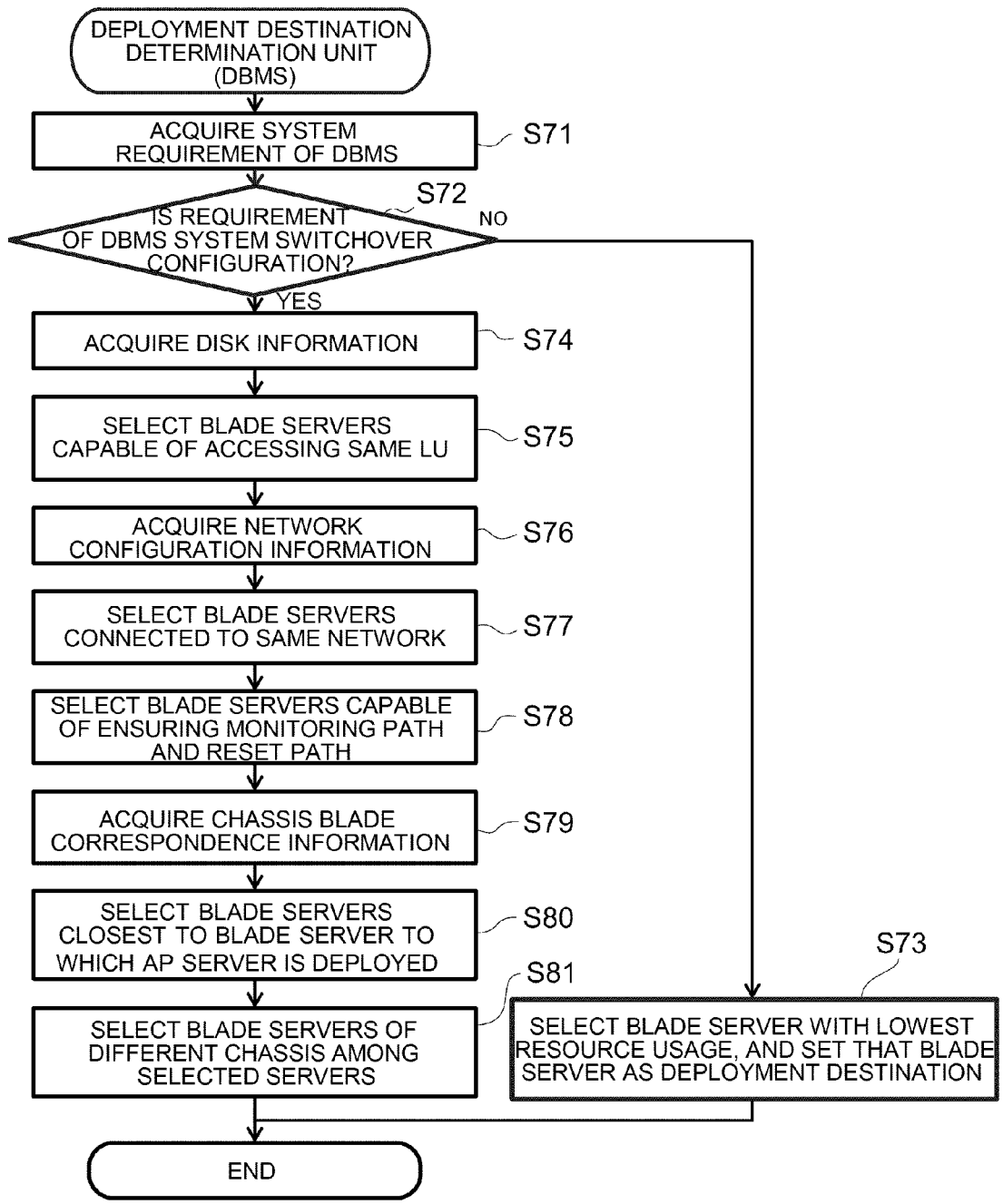
FIG. 13 is a flowchart explaining another processing performed by the deployment destination determination unit in the first embodiment.

Another processing performed by the deployment destination determination unit 42 is now explained with reference to the flowchart shown in FIG. 13. This processing is the specific contents of Step S58 of FIG. 11, and is started by the CPU 16 activating the deployment destination determination unit 42.

The deployment destination determination unit 42 acquires the system requirements of the DBMS based on the assessment result of the configuration assessment unit 40 (S71), and determines the requirements of the DBMS (S72). For example, in order to assess the system requirements of the DBMS, the deployment destination determination unit 42 acquires the deployment condition determination information 62, and determines whether the operating policy of the virtual machine loaded with the DBMS is a system switchover configuration.

When a negative determination result is obtained in Step S72; that is, when it is determined that the operating policy of the virtual machine loaded with the DBMS is not a system switchover configuration, the deployment destination determination unit 42 selects the blade server with the minimal resource usage among the plurality of blade servers 80, 82, sets the selected blade server as the deployment destination of the virtual machine (S73), and then ends the processing with this routine.

Meanwhile, when a positive determination result is obtained in Step S72; that is, when it is determined that the operating policy of the virtual machine loaded with the DBMS is a system switchover configuration, the deployment destination determination unit 42 acquires the disk information 56 (S74). Note that, when the disk information 56 is set in advance or when the user is to manually set the disk information 56, the processing for acquiring the disk information 56 is not executed.

Subsequently, the deployment destination determination unit 42 executes processing for selecting the blade servers capable of accessing the same LU based on the acquired disk information 56 (S75).

Subsequently, the deployment destination determination unit 42 acquires the network configuration information 60 (S76), and executes processing for selecting the blade servers that are connected to the same network based on the acquired network configuration information 60 (S77).

Subsequently, the deployment destination determination unit 42 executes processing for sending and receiving information to and from the agents of the chassis 76, 78, and selecting the blade server capable of ensuring the monitoring path and the reset path (S78).

In other words, in Step S78, the deployment destination determination unit 42 executes processing for selecting the blade server capable of ensuring the monitoring path and the reset path so as to ensure redundant paths.

Subsequently, the deployment destination determination unit 42 acquires the chassis blade correspondence information 58 for selecting the blade servers that exist on different chassis (S79).

Subsequently, the deployment destination determination unit 42 executes processing for selecting the blade servers that are disposed closer to each other (blade servers that are disposed adjacent to each other) based on the network configuration information 60 among the blade servers in which the AP server is deployed; that is, the blade servers in which the virtual machines 202, 204 (virtual machines loaded with the AP servers 210, 214) are deployed based on the assessment result of the configuration assessment unit 40 (S80).

Subsequently, the deployment destination determination unit 42 executes processing for selecting two blade servers among the plurality of blade servers 80, 82 that satisfy the conditions of being blade servers capable of ensuring the monitoring path and the reset path, blade servers that are connected to the same network, and blade servers that exist on different chassis, and which are blade servers that are disposed closer to the blade servers in which the virtual machines 202, 204 (virtual machines loaded with the AP servers 210, 214) are deployed, and setting the two blade servers that were selected, for example, as the deployment destination of the virtual machines 206, 208 (S81), and then ends the processing with this routine.

Note that, in steps S80, S81, the deployment destination determination unit 42 may also adopt a selective condition of selecting the blade servers that are disposed closer to the blade servers in which the AP server is deployed only when "AP server" and "DBMS" are set as the type of software in the virtual machine, and, in other cases, for example, the deployment destination determination unit 42 may exclude the condition of selecting the blade servers that are disposed closer to the blade servers in which the AP server is deployed when only one of "AP server" or "DBMS" is set as the type of software in the virtual machine.

Moreover, in steps S80, S81, by selecting the blade servers that are disposed closer to the blade servers in which the AP server is deployed, the deployment destination determination unit 42 can select two blade servers among the plurality of blade servers 80, 82 that are disposed adjacent to each other and which enable the shortening of the access time.

Figure 14:
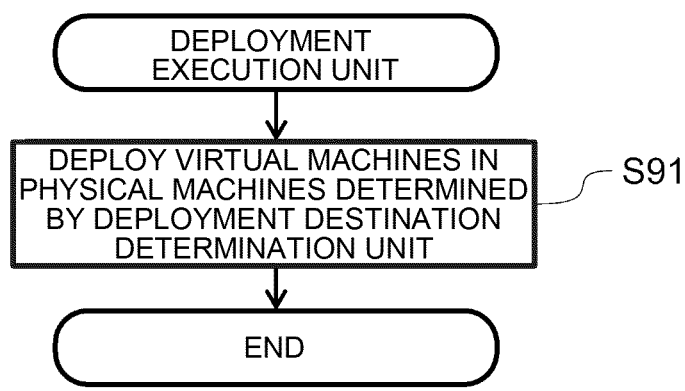
FIG. 14 is a flowchart explaining the processing performed by the deployment execution unit in the first embodiment.

The processing performed by the deployment execution unit 44 is now explained with reference to the flowchart shown in FIG. 14. This processing is started by the CPU 16 activating the deployment execution unit 44.

The deployment execution unit 44 executes processing for deploying the virtual machines 202, 204 respectively in the physical machines; for example, the two blade servers determined by the deployment destination determination unit 42, and processing for deploying the virtual machines 206, 208 respectively in the two blade servers (S91), and then ends the processing with this routine.

Figure 15:
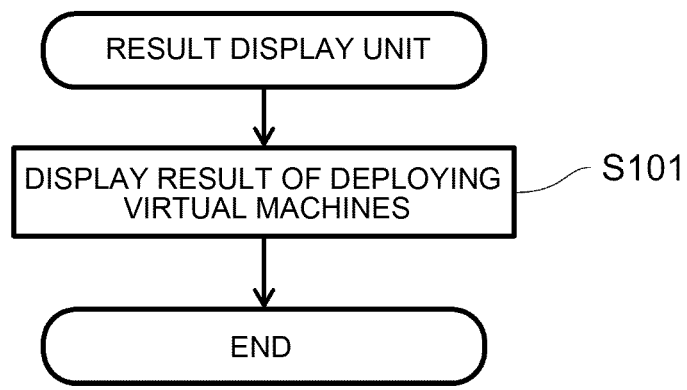
FIG. 15 is a flowchart explaining the processing performed by the result display unit in the first embodiment.

The processing performed by the result display unit 46 is now explained with reference to the flowchart shown in FIG. 15. This processing is started by the CPU 16 activating the result display unit 46.

The result display unit 46 displays the results of the deployment execution unit 44 deploying the respective virtual machines on the screen of the display device 30 (S101), and then ends the processing with this routine.

Figure 16:
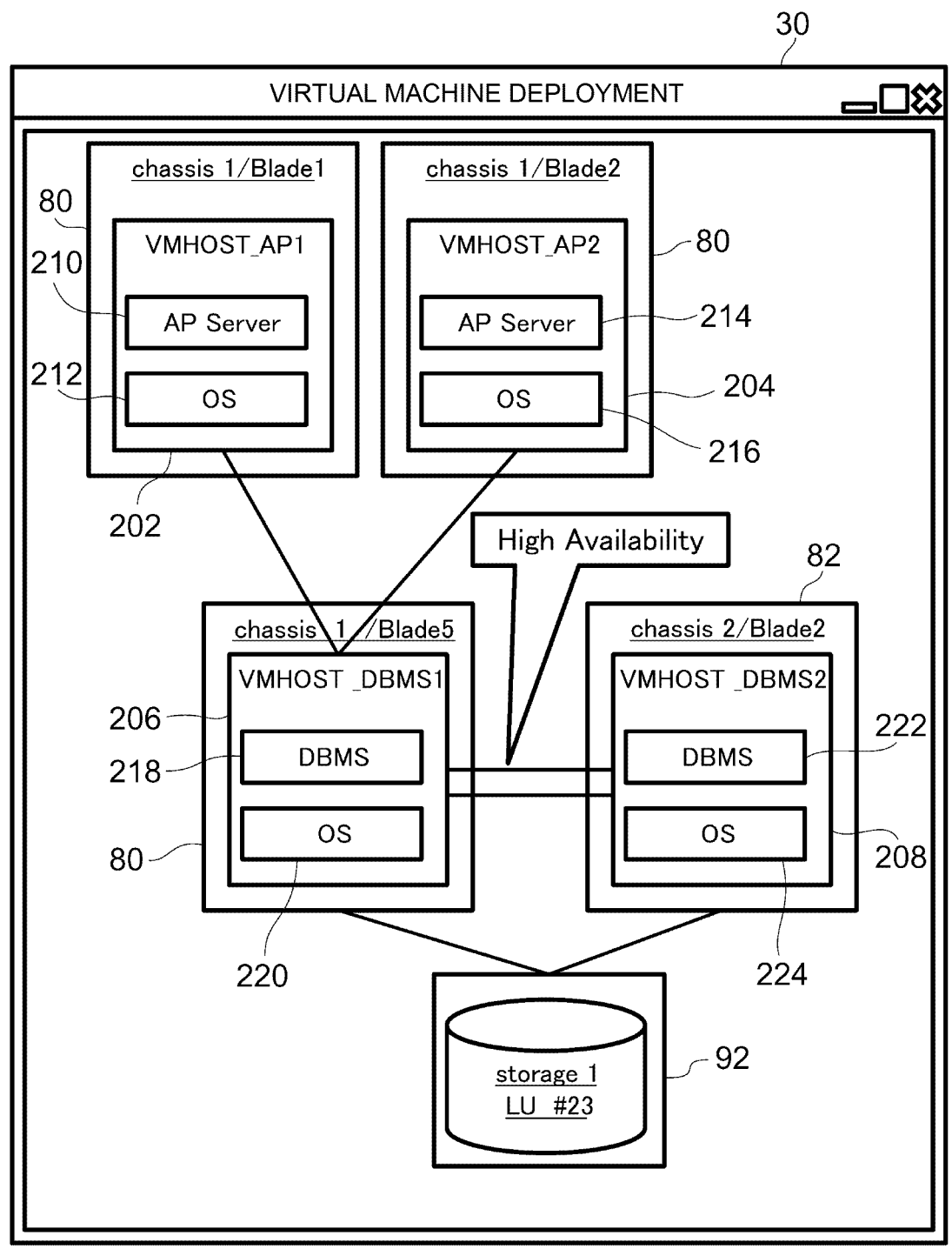
FIG. 16 is a diagram showing a display example upon deploying virtual machines in physical machines.

FIG. 16 shows a display example of the display screen when virtual machines are deployed in physical machines. In FIG. 16, the virtual machine 202 is deployed in the #1 blade server 80 mounted on the #1 chassis 76, and the virtual machine 204 is deployed in the #2 blade server 80 mounted on the #1 chassis 76.

Meanwhile, the virtual machine 206 is deployed in the #5 blade server 80 mounted on the #1 chassis 76, and the virtual machine 208 is deployed in the #2 blade server 82 mounted on the #2 chassis 78.

At this point, the #5 blade server 80 and the #2 blade server 82 can access the #23 LU in the #1 storage apparatus 92.

In the foregoing case, since High Availability is set as the operating policy between the #5 blade server 80 and the #2 blade server 82, when the respective blade servers 80, 82 are of a system switchover configuration, for example, the #5 blade server 80 is used as the blade server of the execution system, and the #2 blade server 82 is used as the blade server of the standby system.

According to the present embodiment, when the type of software that is running on the virtual machine is "AP server" and the operating policy of the software is "Load Balancing", the #1 blade server 80 mounted on the #1 chassis 76 and the #2 blade server 80 mounted on the #1 chassis 76 can be selected as the deployment destination of the virtual machines 202, 204 loaded with the AP servers 210, 214.

Moreover, when the type of software that is running on the virtual machine is "DBMS" and the operating policy of the software is "High Availability", the #5 blade server 80 mounted on the #1 chassis 76 and the #2 blade server 82 mounted on the #2 chassis 78 can be selected as the deployment destination of the virtual machines 206, 208 loaded with the DBMS 218, 222.

Second Embodiment

The present embodiment selects, among a plurality of server machines, the server machine to become the deployment destination of the virtual machine based on the type and operating policy of the software that is running on the virtual machine.

Figure 17:
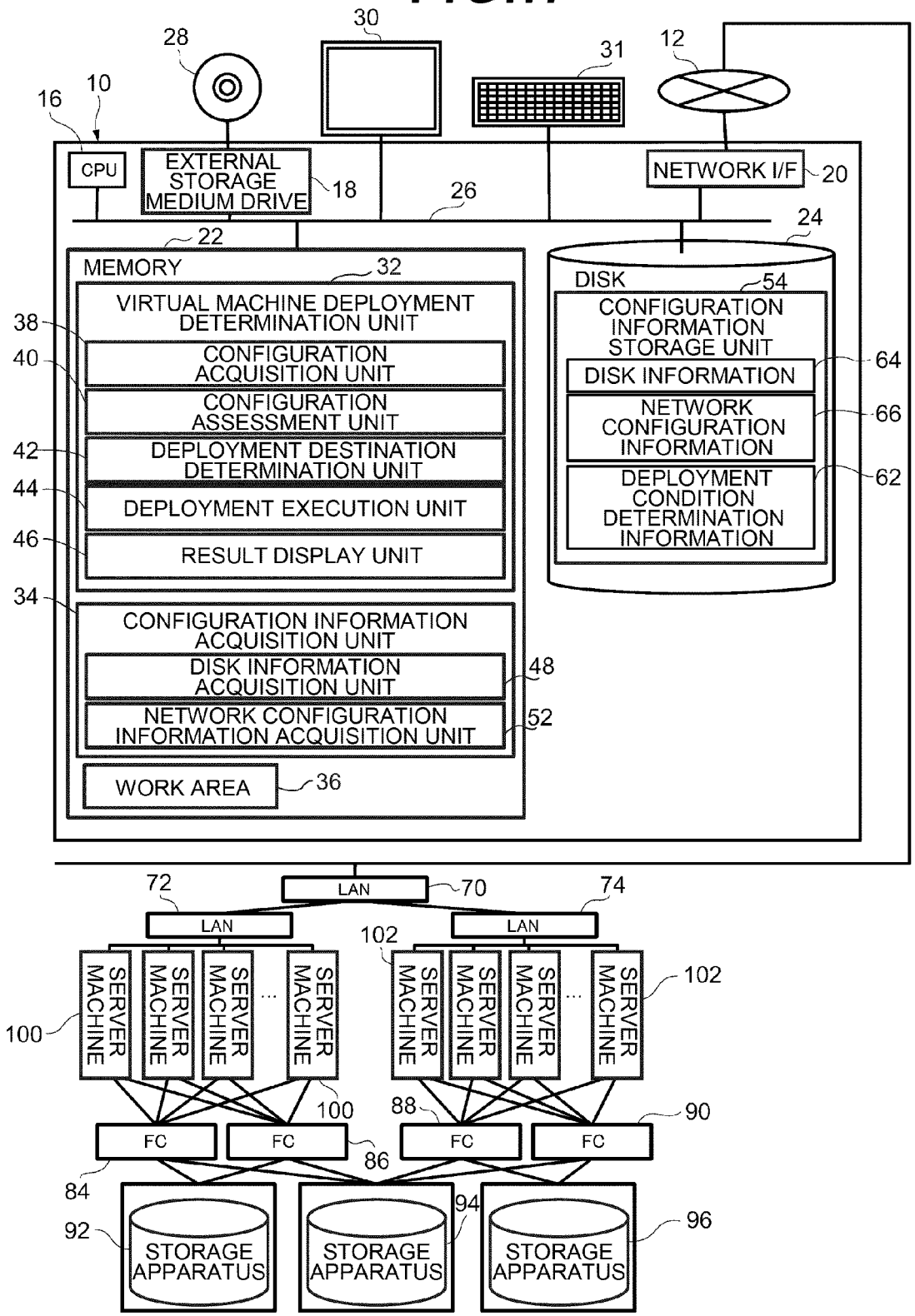
FIG. 17 is a configuration diagram of the computer system in the second embodiment.

FIG. 17 shows a configuration diagram of the computer system of the second embodiment. In the present embodiment, server machines 100, 102 are used in substitute for the blade servers 80, 82 as the physical machines, and the chassis 76, 78 for housing the blade servers 80, 82 are excluded, and the remaining configuration is the same as the first embodiment.

In the foregoing case, the sub machines 100 are each connected to the LAN network switch 72, and the FC network switches 84, 86, respectively, and the server machines 102 are each connected to the LAN network switch 74, and the FC network switches 88, 90, respectively.

Moreover, the chassis blade correspondence information acquisition unit 50 is deleted from the configuration information acquisition unit 34, and the chassis blade correspondence information 58 is deleted from the configuration information storage unit 54. Meanwhile, disk information 64 is stored in the configuration storage unit 54 in substitute for the disk information 56, network configuration information 66 is stored in the configuration storage unit 54 in substitute for the network configuration information 60.

On an aside, the information of "Blade servers of different chassis" is deleted from the deployment condition 62C of the deployment condition determination information 62 in the present embodiment.

FIG. 18 shows a configuration diagram of the disk information in the second embodiment. In FIG. 18, the disk information 64 is information for managing the storage apparatuses and the LUs that are accessible by the respective sub machines 100, 102, and is configured from a server machine number 64A, an accessible storage number 64B, and an accessible LU number 64C.

The server machine number 64A is a number for uniquely identifying the respective server machines 100, 102. Each entry of the server machine number 64A stores a number for identifying the respective server machines 100, 102. For example, "1" is stored in the first entry of the server machine number 64A the number for identifying the #1 server machine 100.

The accessible storage number 64B is a number for identifying the storage apparatuses that are accessible by the respective server machines 100, 102. Each entry of the accessible storage number 64B stores a number for identifying the respective storage apparatuses 92, 94, 96. For example, when the storage apparatuses 92, 94, 96 are respective named the #1 to #3 storage apparatuses, in the entry of the accessible storage number 64B, "1" is stored as the number for identifying the storage apparatus 92, "2" is stored as the number for identifying the storage apparatus 94, and "3" is stored as the number for identifying the storage apparatus 96.

The accessible LU number 64C is the number of the LU that is accessible by the respective server machines 100, 102. Each entry of the accessible LU number 64C stores the number of the LU that is accessible by the respective server machines 100, 102. For example, when the #1 server machine 100 can access the #1 to #4 LUs, "1, 2, 3, 4" is stored in the first entry of the accessible LU number 64C.

FIG. 19 shows a configuration diagram of the network configuration information in the second embodiment. In FIG. 19, the network configuration information 66 is information for managing the connection relation of the respective sub machines 100, 102 and the LAN network switches 70, 72, 74, and is configured from a network switch number 66A, a connection server machine number 66B, and a connection network switch number 66C.

The network switch number 66A is a number for uniquely identifying the respective LAN network switches 70, 72, 74. Each entry of the network switch number 60A stores a number of identifying the respective LAN network switches 70, 72, 74. For example, when the LAN network switch 72 is the #1 network switch, the LAN network switch 74 is the #2 network switch, and the LAN network switch 70 is the #3 network switch, "1" is stored in the first entry of the network switch number 66A as the number for identifying the LAN network switch 72, "2" is stored in the second entry of the network switch number 66A as the number for identifying the LAN network switch 74, and "3" is stored in the third entry of the network switch number 66A as the number for identifying the LAN network switch 70.

The connection server machine number 66B is a number for identifying the server machines 100, 102 that are connected to the respective LAN network switches 70 to 74.

Each entry of the connection server machine number 66B stores a number for identifying the server machines 100, 102 that are connected to the respective LAN network switches 70 to 74. For example, when the #1 to #8 server machines 100 are connected to the LAN network switch 72, "1 to 8" is stored in the first entry of the connection server machine number 66B.

Note that, since the LAN network switch 70 is not connected to the server machines 100, 102, "–" is stored in the third entry of the connection server machine number 66B.

The connection network switch number 66C is a number for identifying the connection relationship between the respective LAN network switches 70, 72, 74. Each entry of the connection network switch number 66C stores a number of the LAN network switch that is connected to the respective LAN network switches 70, 72, 74. For example, when the #3 LAN network switch 70 is connected to each of the LAN network switches 72, 74, "1, 2" is stored in the third entry of the connection network switch number 66C.

Figure 20:
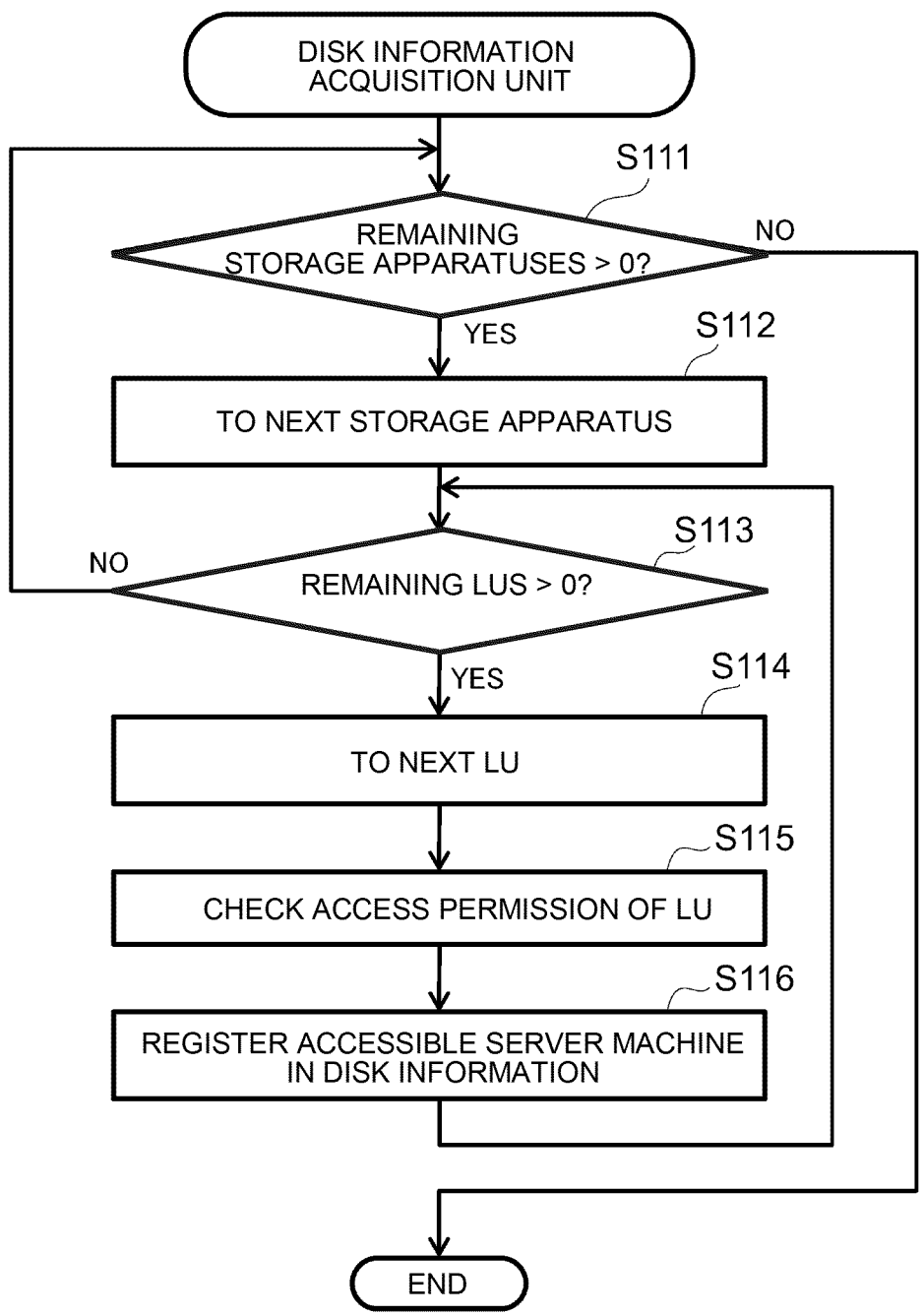
FIG. 20 is a flowchart explaining the processing of the disk information acquisition unit in the second embodiment.

The processing performed by the disk information acquisition unit in the second embodiment is now explained with reference to the flowchart shown in FIG. 20. This processing is started by the CPU 16 activating the disk information acquisition unit 48.

The disk information acquisition unit 48 executes processing for sequentially searching the storage apparatuses 92, 94, 96, checking which server machine can access the LU in the respective storage apparatuses, and registering the check result in the disk information 64.

Specifically, the disk information acquisition unit 48 determines, in the course of sequentially searching the respective storage apparatuses 92, 94, 96, whether the number of remaining storage apparatuses is greater than 0 (S111).

When it is determined that the number of remaining storage apparatuses is smaller than 0 in Step S111, since there are no remaining storage apparatuses to be searched, the disk information acquisition unit 48 ends the processing with this routine.

When it is determined that the number of remaining storage apparatuses is greater than 0 in Step S111, the disk information acquisition unit 48 executes processing for searching the next storage apparatus (S112). For example, in the case of sequentially searching the #1 to #3 storage apparatuses 92, 94, 96, the disk information acquisition unit 48 searches the #1 storage apparatus 92, thereafter searches the #2 storage apparatus 94, and thereafter searches the #3 storage apparatus 96.

Subsequently, the disk information acquisition unit 48 determines whether the remaining number of LUs to be checked, among the LUs existing in the storage apparatus to be searched, is greater than 0 (S113).

When a negative determination result is obtained in Step S113, since there are no remaining LUs to be checked among the LUs existing in the storage apparatus to be searched, the disk information acquisition unit 48 returns to the processing of Step S111, and repeats the processing of Step S111 to Step S113.

Meanwhile, when a positive determination result is obtained in Step S113, since there is a remaining LU to be checked among the LUs existing in the storage apparatus to be searched, the disk information acquisition unit 48 executes processing for selecting the next LU (S114).

In Step S114, the disk information acquisition unit 48 executes processing for sequentially selecting the LUs existing in the storage apparatus to be searched.

Subsequently, the disk information acquisition unit 48 checks the access permission of the selected LU (S115). Specifically, the disk information acquisition unit 48 makes an inquiry to the storage apparatus to be searched with regard to which server machine can access the selected LU (S115).

Subsequently, the disk information acquisition unit 48 registers, in the disk information 64, the server machine number of the server machine 100 or the server machine 102 as the server machine that can access the selected LU based on the information obtained from the storage apparatus to be searched (S116), thereafter returns to the processing of Step S113, and then repeats the processing of Step S113 to Step S116.

The disk information acquisition unit 48 thereafter checks which server machine can access the respective LUs with regard to all LUs existing in the respective storage apparatuses 92, 94, 96, registers the respective check results in the disk information 64, and then ends the processing with this routine.

Figure 21:
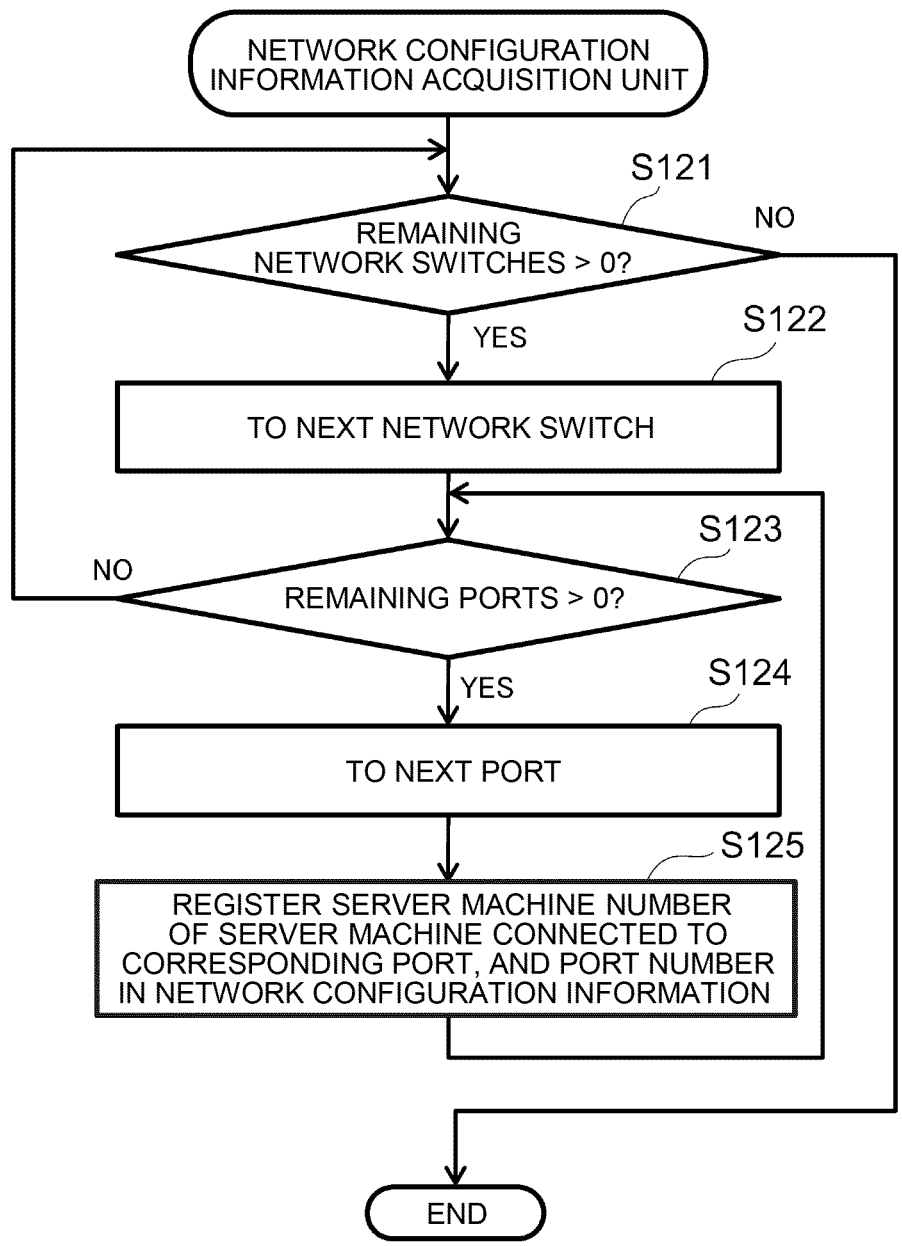
FIG. 21 is a flowchart explaining the processing performed by the network configuration information acquisition unit in the second embodiment.

The processing performed by the network configuration information acquisition unit 52 in the second embodiment is now explained with reference to the flowchart shown in FIG. 21. This processing is started by the CPU 16 activating the network configuration information acquisition unit 52.

The network configuration information acquisition unit 52 executes processing for sending and receiving information to and from the respective agents existing in the LAN network switches 70, 72, 74, checking the server machine number of the server machined that are connected to the ports of the respective LAN network switches 70, 72, 74, and registering the check results in the network configuration information 66.

Specifically, the network configuration information acquisition unit 52 determines, in the course of sequentially searching the LAN network switches 70, 72, 74, whether the number of remaining network switches to be searched is greater than 0 (S121).

When the network configuration information acquisition unit 52 obtains a positive determination result in Step S121, since there is a remaining network switch to be searched, the network configuration information acquisition unit 52 executes processing for selecting the next network switch (S122).

In step 122, the network configuration information acquisition unit 52 executes processing for sequentially selecting the LAN network switches 70, 72, 74 to be searched.

Meanwhile, when the network configuration information acquisition unit 52 obtains a negative determination result in Step S121, since there are no remaining network switches to be searched, the network configuration information acquisition unit 52 ends the processing with this routine.

Subsequently, the network configuration information acquisition unit 52 determines whether the number of remaining ports to be checked in the selected LAN network switch is greater than 0 (S123).

When the network configuration information acquisition unit 52 obtains a negative determination result in Step S123, since there are no remaining ports to be checked in the selected LAN network switch, the network configuration information acquisition unit 52 returns to the processing of Step S121, and repeats the processing of Step S121 to Step S123.

Meanwhile, when the network configuration information acquisition unit 52 obtains a positive determination result in Step S123, since there is a remaining port to be checked in the selected LAN network switch, the network configuration information acquisition unit 52 executes processing for selecting the next port (S124).

In Step S124, the network configuration information acquisition unit 52 executes processing for sequentially selecting the ports to be checked that exist in the selected LAN network switch to be searched.

Subsequently, the network configuration information acquisition unit 52 registers, in the network configuration information 66, the server machine number of the server machine 100 or the server machine 102 that is connected to the selected port to be checked, and the port number of the selected port to be checked (S125), and then returns to the processing of Step S123, and repeats the processing of Step S123 to Step S125.

The network configuration information acquisition unit 52 thereafter executes processing for associating, with regard to all ports existing in the respective LAN network switches 70, 72, 74, the server machine number of the server machine 100 or the server machine 102 connected to the respective ports and the port number of the respective ports connected to the server machine 100 or the server machine 102 with the respective LAN network switches 70, 72, 74, and registering the association in the network configuration information 66, and then ends the processing with this routine.

Figure 22:
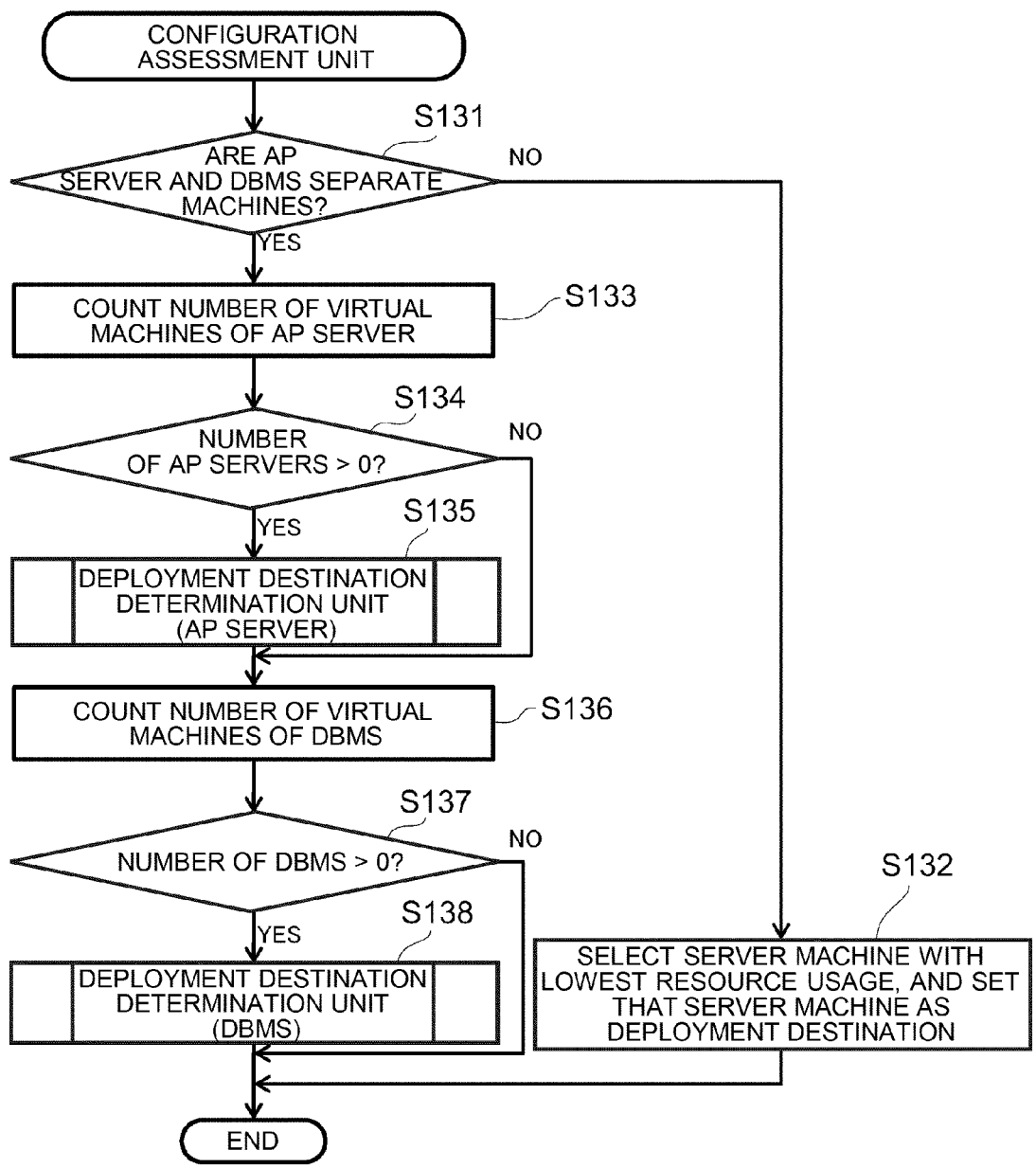
FIG. 22 is a flowchart explaining the processing performed by the configuration assessment unit in the second embodiment.

The processing performed by the configuration assessment unit 40 is now explained with reference to the flowchart shown in FIG. 22. This processing is started by the CPU 16 activating the configuration assessment unit 40.

Upon deploying a plurality of virtual machines in the respective physical machines, the configuration assessment unit 40 foremost accesses information that was input to the configuration acquisition unit 38 or information that was transferred from the configuration acquisition unit 38 to the work area 36, and determines whether the AP server and the DBMS exist in separate machines; that is, in separate virtual machines (S131).

When a negative determination result is obtained in Step S131; that is, when it is determined that the AP server and the DBMS exist in the same virtual mine, the configuration assessment unit 40 selects the server machine with the minimum resource usage among the plurality of server machines 100, 102, determines the selected server machine as the deployment destination of the virtual machine (S132), and ends the processing with this routine.

Meanwhile, when a positive determination result is obtained in Step S131; that is, when the AP server and the DBMS respectively exist in separate virtual machines, the configuration assessment unit 40 counts the number of virtual machines in which the AP server exists (S133), and determines whether the number of AP servers is greater than 0 based on the count value (S134).

When the configuration assessment unit 40 obtains a negative determination result in Step S134, because there is no AP server in the virtual machine to be subject to determination, the configuration assessment unit 40 proceeds to the processing of Step S136. Meanwhile, when the configuration assessment unit 40 obtains a positive determination result in Step S134, since there is an AP server in the virtual machine to be subject to determination, the configuration assessment unit 40 proceeds to the processing performed by the deployment destination determination unit 42 (S135).

Note that, in Step S133, when the virtual machines 202, 204, 206, 208 become the virtual machines to be subject to determination, the configuration assessment unit 40 counts the number of virtual machines 202, 204 loaded with the AP servers 210, 214 as two.

In Step S135, the deployment destination determination unit 42 executes processing for deploying the virtual machine 202 loaded with the AP server 210 and the virtual machine 204 loaded with the AP server 214 in the server machine 100 or the server machine 102, respectively.

Subsequently, the configuration assessment unit 40 counts the number of virtual machines loaded with the DBMS (S136), and determines whether the number of DBMS is greater than 0 based on the count value (S137).

When the configuration assessment unit 40 obtains a negative determination result in Step S137, since no DBMS exists in the virtual machine to be subject to determination, the configuration assessment unit 40 ends the processing with this routine. Meanwhile, when the configuration assessment unit 40 obtains a positive determination result in Step S137, since a DBMS exists in the virtual machine to be subject to determination, the configuration assessment unit 40 proceeds to the processing performed by the deployment destination determination unit 42 (S138), and thereafter ends the processing with this routine.

Note that, in Step S56, when the virtual machines 202, 204, 206, 208 become the virtual machines to be subject to determination, the configuration assessment unit 40 counts the number of virtual machines 206, 208 loaded with the DBMS 218, 222 as two.

Moreover, in Step S138, the deployment destination determination unit 42 executes processing for deploying the virtual machine 206 loaded with the DBMS 218 and the virtual machine 208 loaded with the DBMS 222 in the server machine 100 or the server machine 102, respectively.

Figure 23:
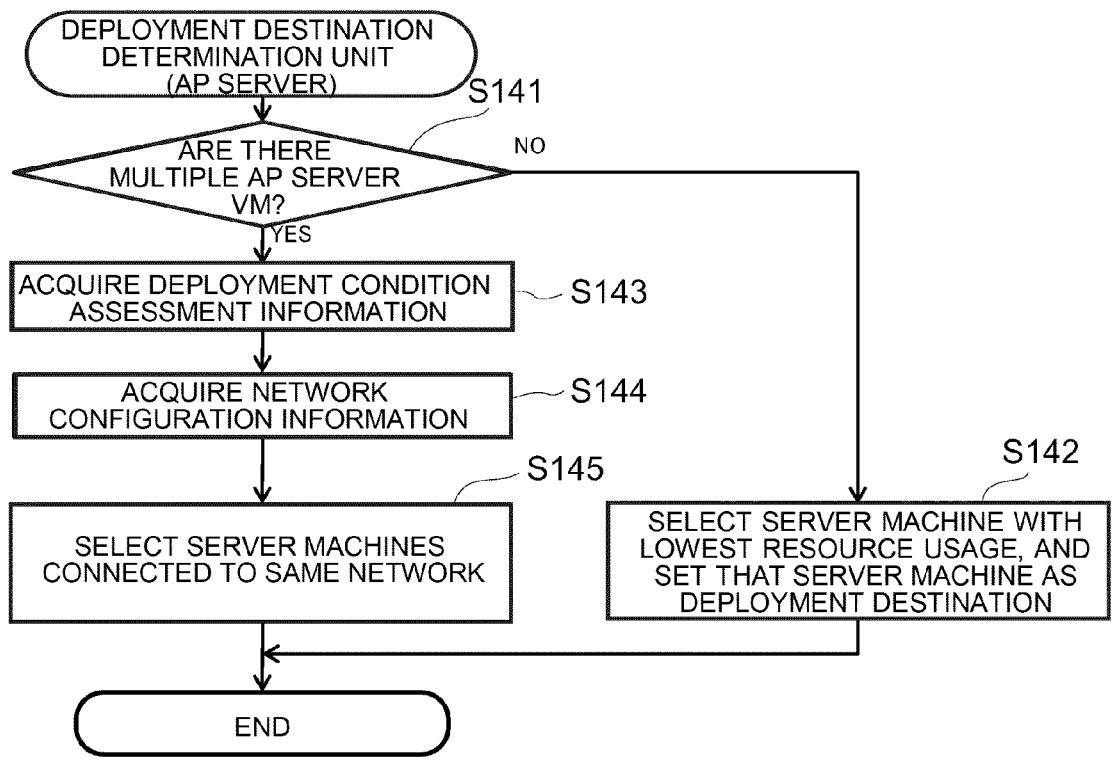
FIG. 23 is a flowchart explaining the processing performed by the deployment destination determination unit in the second embodiment.

The processing performed by the deployment destination determination unit 42 in the second embodiment is now explained with reference to the flowchart shown in FIG. 23. This processing is the specific contents of Step S135 of FIG. 22, and is started by the CPU 16 activating the deployment destination determination unit 42.

The deployment destination determination unit 42 determines whether there are multiple AP servers based on the assessment result of the configuration assessment unit 42 (S141). In other words, the deployment destination determination unit 42 determines whether there are a plurality of virtual machines that are loaded with the AP server.

When a negative determination result is obtained in Step S141; that is, when it is determined that one virtual machine is loaded with the AP server, the deployment destination determination unit 42 selects the server machine with the minimal resource usage among the plurality of server machines 100, 102, sets the selected server machine as the deployment destination of the virtual machine (S142), and then ends the processing with this routine.

Meanwhile, when a positive determination result is obtained in Step S141, the deployment destination determination unit 42 executes processing for acquiring the deployment condition determination information 62 (S143), and thereafter executes processing for acquiring the network configuration information 66 (S144).

Subsequently, the deployment destination determination unit 42 refers to the acquired deployment condition determination information 62 and the acquired network configuration information 66, selects two server machines that exist on the same network (S145), and then ends the processing with this routine.

In Step S145, when the type of software loaded in the virtual machines 202, 204 is "AP server" and the operating policy is "Load Balancing", the deployment destination determination unit 42 selects the server machines on the same network as the deployment condition. In the foregoing case, one server machine 100 is selected and one server machine 102 is selected are selected as the server machines connected to the same network 12 so as to balance the load.

Figure 24:
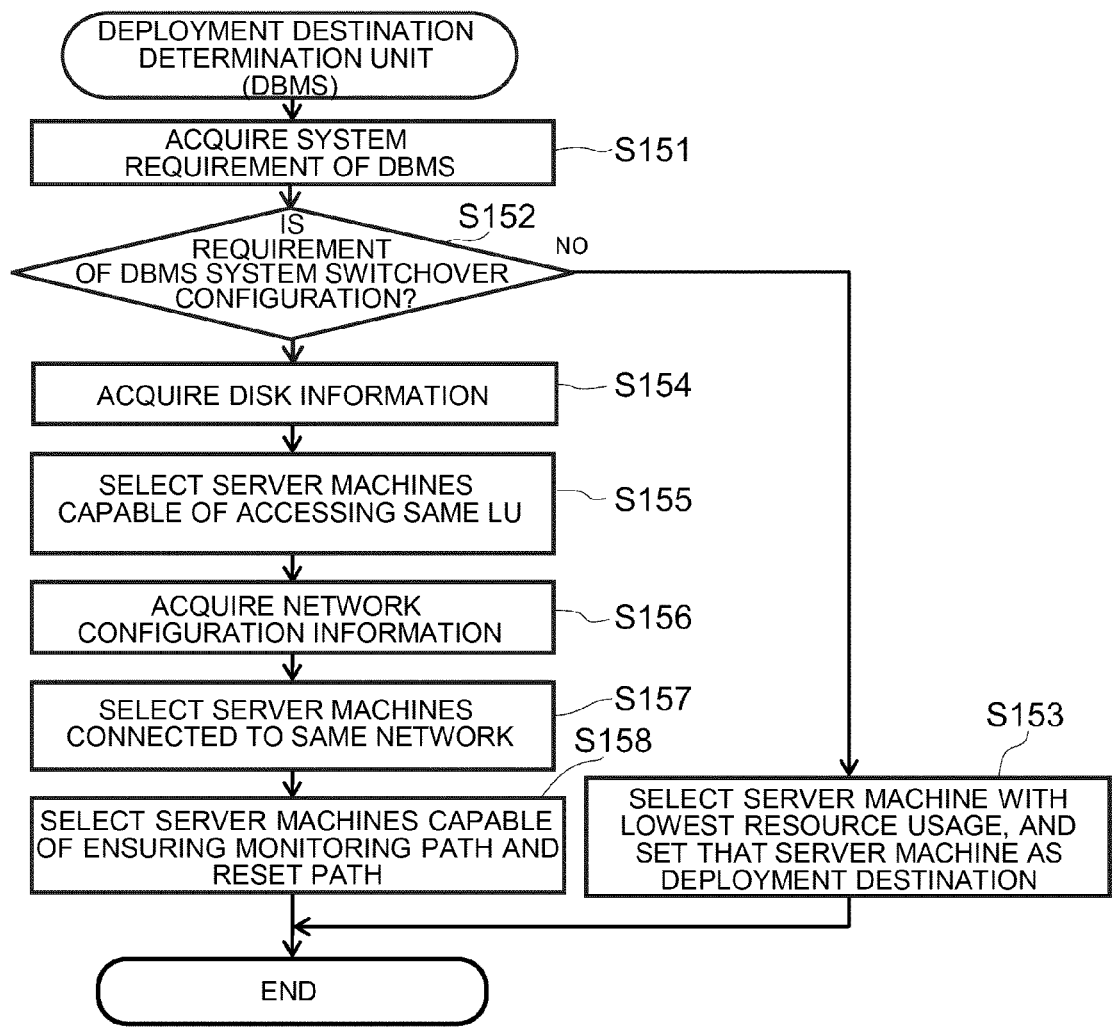
FIG. 24 is a flowchart explaining another processing performed by the deployment destination determination unit in the second embodiment.

Another processing performed by the deployment destination determination unit 42 in the second embodiment is now explained with reference to the flowchart shown in FIG. 24. This processing is the specific contents of Step S138 of FIG. 22, and is started by the CPU 16 activating the deployment destination determination unit 42.

The deployment destination determination unit 42 acquires, for example, the deployment condition determination information 62 in order to determine the system requirements of the DBMS based on the assessment result of the configuration assessment unit 40 (S151), and determines the requirements of the DBMS (S152). In other words, the deployment destination determination unit 42 determines whether the operating policy of the virtual machine loaded with the DBMS is a system switchover configuration.

When a negative determination result is obtained in Step S152; that is, when it is determined that the operating policy of the virtual machine loaded with the DBMS is not a system switchover configuration, the deployment destination determination unit 42 selects the server machine with the minimal resource usage among the plurality of server machines 100, 102, sets the selected server machine as the deployment destination of the virtual machine (S153), and then ends the processing with this routine.

Meanwhile, when a positive determination result is obtained in Step S152; that is, when it is determined that the operating policy of the virtual machine loaded with the DBMS is a system switchover configuration, the deployment destination determination unit 42 acquires the disk information 64 (S154). Note that, when the disk information 64 is set in advance or when the user is to manually set the disk information 64, the processing for acquiring the disk information 64 is not executed.

Subsequently, the deployment destination determination unit 42 executes processing for selecting the server machines capable of accessing the same LU based on the acquired disk information 64 (S155).

Subsequently, the deployment destination determination unit 42 acquires the network configuration information 66 (S156), and executes processing for selecting the server machines that are connected to the same network based on the acquired network configuration information 66 (S157).

Subsequently, the deployment destination determination unit 42 executes processing for sending and receiving information to and from the respective server machines 100, 102, and selecting the server machine capable of ensuring the monitoring path and the reset path (S158). In other words, in Step S158, the deployment destination determination unit 42 executes processing for selecting the server machine capable of ensuring the monitoring path and the reset path so as to ensure redundant paths.

Consequently, the deployment destination determination unit 42 selects, among the plurality of server machines 100, 102, two server machines capable of ensuring the monitoring path and the reset path and which are connected to the same network, and set the selected two server machines as, for example, the deployment destination of the virtual machines 206, 208, and then ends the processing with this routine.

Note that, by additionally selecting server machines that are disposed closer to the server machines in which the virtual machines 202, 204 are deployed among the server machines capable of ensuring the monitoring path and the reset path and which are connected to the same network, the deployment destination determination unit 42 can select two server machines among the plurality of server machines 100, 102 which enable the shortening of the access time.

Figure 25:
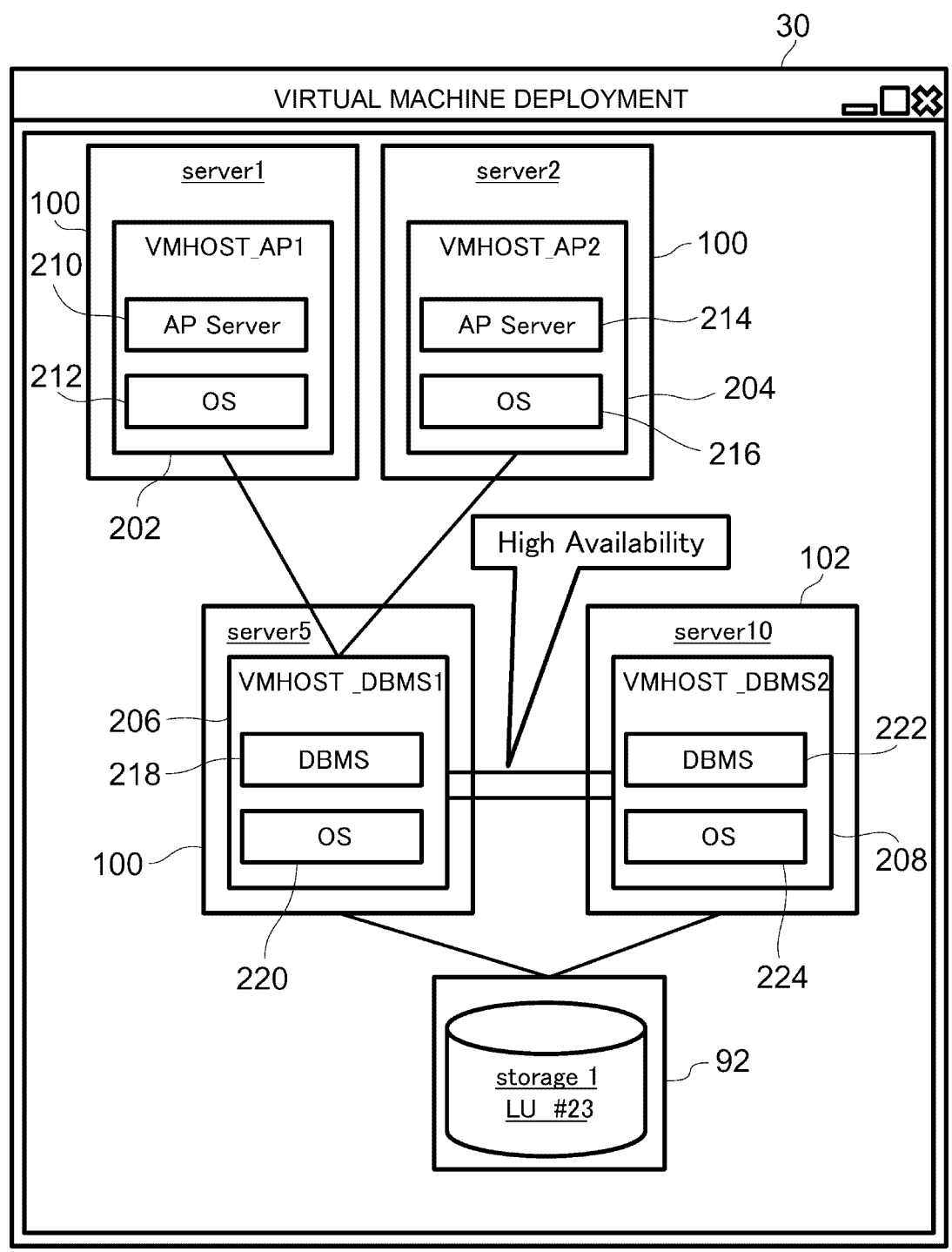
FIG. 25 is a diagram showing a display example upon deploying virtual machines in physical machines.

FIG. 25 shows a display example of the display screen when virtual machines are deployed in physical machines based on the processing performed by the deployment destination determination unit 42. In FIG. 25, the virtual machine 202 is deployed in the #1 server machine 100, and the virtual machine 204 is deployed in the #2 server machine 100.

Meanwhile, the virtual machine 206 is deployed in the #5 server machine 100, and the virtual machine 208 is deployed in the #10 server machine 102.

At this point, the #5 server machine 100 and the #10 server machine 102 can access the #23 LU in the #1 storage apparatus 92.

In the foregoing case, since High Availability is set as the operating policy between the #5 server machine 100 and the #10 server machine 102, when the respective server machines 100, 102 are of a system switchover configuration, for example, the #5 server machine 100 is used as the server machine of the execution system, and the #10 server machine 102 is used as the server machine of the standby system.

According to the present embodiment, when the type of software that is running on the virtual machine is "AP server" and the operating policy of the software is "Load Balancing", the #1 server machine 100 and the #2 server machine 100 can be selected as the deployment destination of the virtual machines 202, 204 loaded with the AP servers 210, 214.

Moreover, when the type of software that is running on the virtual machine is "DBMS" and the operating policy of the software is "High Availability", the #5 server machine 100 and the #10 server machine 102 can be selected as the deployment destination of the virtual machines 206, 208 loaded with the DBMS 218, 222.

The present invention is not limited to the embodiments described above, and various modified examples are included therein. Moreover, a part of the configuration of the respective embodiments may be substituted with a configuration of another embodiment, and the configuration of the respective embodiments may be added to the configuration of another embodiment. Moreover, a party of the configuration of the respective embodiments may be added to, deleted from, or substituted with another configuration.

Moreover, a part or the whole of the virtual machine deployment determination unit 32 and the configuration information acquisition unit 34 may be realized with hardware by designing an integrated circuit or the like.

Moreover, information such as programs and tables may be recorded in advance in memory or recording devices such as a hard disk or SSD, or in recording medium such as an IC card, SD memory card, DVD or the like.

For example, a program for causing a computer for managing a plurality of physical machines (for instance, blade servers or server machines that control the I/O of data to and from one or more storage apparatuses) as physical machines in which a virtual machine is to be deployed, to realize a function of acquiring setting information including a type of software that is running on the virtual machine and an operating policy of the software, a function of referring to deployment condition determination information which prescribes a deployment condition for selecting the physical machine to become the deployment destination of the virtual machine is associated with the operating policy of the software and stored therein based on the acquired setting information, and a function of determining the physical machine to become the deployment destination of the virtual machine by selecting the physical machine among the plurality of physical machines based on the referral result, is stored in advance in a recording medium.

REFERENCE SIGNS LIST 10 computer, 12 network, 16 CPU, 22 memory, 24 disk, 30 display device, 32 virtual machine deployment determination unit, 34 configuration information acquisition unit, 38 configuration acquisition unit, 40 configuration assessment unit, 42 deployment destination determination unit, 44 deployment execution unit, 46 result display unit, 48 disk information acquisition unit, 50 chassis blade correspondence information acquisition unit, 52 network configuration information acquisition unit, 54 configuration information storage unit, 56 disk information, 58 chassis blade correspondence information, 60 network configuration information, 62 deployment condition determination information, 76, 78 chassis, 80, 82 blade server, 92, 94, 96 storage apparatus, 100, 102 server machine.

The invention claimed is:

1. A computer for managing a virtual machine, which is a virtualization of hardware of a computer resource, comprising:
  a virtual machine deployment determination unit that manages a plurality of physical machines as physical machines in which the virtual machine is to be deployed, wherein the virtual machine deployment determination unit acquires setting information including a type of software that is running on the virtual machine and an operating policy of the software, and determines a physical machine to become a deployment destination of the virtual machine by selecting the physical machine among the plurality of physical machines based on the acquired setting information,
  the computer further comprising:
  a configuration information storage unit wherewith deployment condition determination information which prescribes a deployment condition for selecting the physical machine to become the deployment destination of the virtual machine is associated with the operating policy of the software and stored therein,
  wherein the virtual machine deployment determination unit refers to the deployment condition determination information based on the acquired setting information, and determines the physical machine to become the deployment destination of the virtual machine based on the referral result,
  wherein the configuration information storage unit stores disk information, wherewith a logical unit that is accessible by each of the physical machines among a plurality of logical units formed in a storage area of a storage apparatus is associated with each of the physical machines and stored in the disk information, and
  wherein the virtual machine deployment determination unit refers to the disk information when physical machines capable of accessing a same logical unit are prescribed as a deployment condition corresponding to the acquired setting information in the deployment condition determination information, and determines the physical machines capable of accessing the same logical unit as the physical machines to become the deployment destination of the virtual machine among the plurality of physical machines based on the referral result.

2. The computer according to claim 1,
wherein the configuration information storage unit stores network configuration information, wherewith a connection relationship of the plurality of physical machines and the computer is associated with a network connecting the plurality of physical machines and the computer and stored in the network configuration information,
wherein the virtual machine deployment determination unit refers to the network configuration information when physical machines connected to a same network are prescribed as a deployment condition corresponding to the acquired setting information in the deployment condition determination information, and determines the physical machines connected to the same network as the physical machines to become the deployment destination of the virtual machine among the plurality of physical machines based on the referral result.

3. The computer according to claim 1,
wherein the configuration information storage unit stores chassis blade correspondence information, wherewith a chassis mounted with the plurality of physical machines is associated with each of the physical machines and stored in the chassis blade correspondence information, and
wherein the virtual machine deployment determination unit refers to the chassis blade correspondence information when physical machines existing on different chassis are prescribed as a deployment condition corresponding to the acquired setting information in the deployment condition determination information, and determines the physical machines existing on different chassis as the physical machines to become the deployment destination of the virtual machine among the plurality of physical machines based on the referral result.

4. The computer according to claim 1,
wherein the configuration information storage unit stores network configuration information, wherewith a connection relationship of the plurality of physical machines and the computer is associated with a network connecting the plurality of physical machines and the computer and stored in the network configuration information, and disk information, wherewith a logical unit that is accessible by each of the physical machines among a plurality of logical units formed in a storage area of the storage apparatus is associated with each of the physical machines and stored in the disk information, and
wherein the virtual machine deployment determination unit refers to the network configuration information and the disk information when physical machines connected to a same network and physical machines capable of accessing a same logical unit are prescribed as a deployment condition corresponding to the acquired setting information in the deployment condition determination information, and determines the physical machines connected to the same network and the physical machines capable of accessing the same logical unit as the physical machines to become the deployment destination of the virtual machine among the plurality of physical machines based on the referral result.

5. The computer according to claim 1,
wherein the configuration information storage unit stores network configuration information, wherewith a connection relationship of the plurality of physical machines and the computer is associated with a network connecting the plurality of physical machines and the computer and stored in the network configuration information, disk information, wherewith a logical unit that is accessible by each of the physical machines among a plurality of logical units formed in a storage area of the storage apparatus is associated with each of the physical machines and stored in the disk information, and chassis blade correspondence information, wherewith a chassis mounted with the plurality of physical machines is associated with each of the physical machines and stored in the chassis blade correspondence information, and wherein the virtual machine deployment determination unit refers to the network configuration information, the disk information and the chassis blade correspondence information when physical machines connected to a same network and physical machines capable of accessing a same logical unit and physical machines existing on different chassis are prescribed as a deployment condition corresponding to the acquired setting information in the deployment condition determination information, and determines the physical machines connected to the same network and the physical machines capable of accessing the same logical unit and the physical machines existing on different chassis as the physical machines to become the deployment destination of the virtual machine among the plurality of physical machines based on the referral result.

6. The computer according to claim 2, wherein the network configuration information includes physical machine information for identifying physical machines that are disposed adjacent to each other among the physical machines connected to the same network, and wherein the virtual machine deployment determination unit refers to the network configuration information when the physical machines connected to the same network and the physical machines that are disposed adjacent to each other are prescribed as a deployment condition corresponding to the acquired setting information in the deployment condition determination information, and determines the physical machines connected to the same network and the physical machines that are disposed adjacent to each other as the physical machines to become the deployment destination of the virtual machine among the plurality of physical machines based on the referral result.

7. A virtual machine deployment method in a computer for managing a virtual machine, which is a virtualization of hardware of a computer resource, comprising:

an acquisition step of a virtual machine deployment determination unit, which manages a plurality of physical machines as physical machines in which the virtual machine is to be deployed, acquiring setting information including a type of software that is running on the virtual machine and an operating policy of the software; and a determination step of the virtual machine deployment determination unit determining a physical machine to become a deployment destination of the virtual machine by selecting the physical machine among the plurality of physical machines based on the acquired setting information, wherein, in the determination step, the virtual machine deployment determination unit refers to deployment condition determination information which prescribes a deployment condition for selecting the physical machine to become the deployment destination of the virtual machine is associated with the operating policy of the software and stored therein based on the acquired setting information, and determines the physical machine to become the deployment destination of the virtual machine based on the referral result, wherein, when physical machines capable of accessing a same logical unit are prescribed as a deployment condition corresponding to the acquired setting information in the deployment condition determination information, in the determination step, the virtual machine deployment determination unit refers to disk information, wherewith a logical unit that is accessible by each of the physical machines among a plurality of logical units formed in a storage area of a storage apparatus is associated with each of the physical machines and stored in the disk information, and determines the physical machines capable of accessing the same logical unit as the physical machines to become the deployment destination of the virtual machine among the plurality of physical machines based on the referral result.

8. The virtual machine deployment method according to claim 7, wherein, when physical machines connected to a same network are prescribed as a deployment condition corresponding to the acquired setting information in the deployment condition determination information, in the determination step, the virtual machine deployment determination unit refers to network configuration information, wherewith a connection relationship of the plurality of physical machines and the computer is associated with a network connecting the plurality of physical machines and the computer and stored in the network configuration information, and determines the physical machines connected to the same network as the physical machines to become the deployment destination of the virtual machine among the plurality of physical machines based on the referral result.

9. The virtual machine deployment method according to claim 8, wherein, when the physical machines connected to the same network and the physical machines that are disposed adjacent to each other are prescribed as a deployment condition corresponding to the acquired setting information in the deployment condition determination information, in the determination step, the virtual machine deployment determination unit refers to the network configuration information including physical machine information for identifying physical machines that are disposed adjacent to each other among the physical machines connected to the same network, and determines the physical machines connected to the same network and the physical machines that are disposed adjacent to each other as the physical machines to become the deployment destination of the virtual machine among the plurality of physical machines based on the referral result.

10. The virtual machine deployment method according to claim 7, wherein, when physical machines existing on different chassis are prescribed as a deployment condition corresponding to the acquired setting information in the deployment condition determination information, in the determination step, the virtual machine deployment determination unit refers to chassis blade correspondence information, wherewith a chassis mounted with the plurality of physical machines is associated with each of the physical machines and stored in the chassis blade correspondence information, and determines the physical machines existing on different chassis as the physical machines to become the deployment destination of the virtual machine among the plurality of physical machines based on the referral result.

11. The virtual machine deployment method according to claim 7, wherein, when physical machines connected to a same network and physical machines capable of accessing a same logical unit are prescribed as a deployment condition corresponding to the acquired setting information in the deployment condition determination information, in the determination step, the virtual machine deployment determination unit refers to network configuration information, wherewith a connection relationship of the plurality of physical machines and the computer is associated with a network connecting the plurality of physical machines and the computer and stored in the network configuration information, and disk information, wherewith a logical unit that is accessible by each of the physical machines among a plurality of logical units formed in a storage area of the storage apparatus is associated with each of the physical machines and stored in the disk information, and determines the physical machines connected to the same network and the physical machines capable of accessing the same logical unit as the physical machines to become the deployment destination of the virtual machine among the plurality of physical machines based on the referral result.

12. The virtual machine deployment method according to claim 7,
wherein, when physical machines connected to a same network and physical machines capable of accessing a same logical unit and physical machines existing on different chassis are prescribed as a deployment condition corresponding to the acquired setting information in the deployment condition determination information, in the determination step, the virtual machine deployment determination unit refers to network configuration information, wherewith a connection relationship of the plurality of physical machines and the computer is associated with a network connecting the plurality of physical machines and the computer and stored in the network configuration information, disk information, wherewith a logical unit that is accessible by each of the physical machines among a plurality of logical units formed in a storage area of the storage apparatus is associated with each of the physical machines and stored in the disk information, and chassis blade correspondence information, wherewith a chassis mounted with the plurality of physical machines is associated with each of the physical machines and stored in the chassis blade correspondence information, and determines the physical machines connected to the same network and the physical machines capable of accessing the same logical unit and the physical machines existing on different chassis as the physical machines to become the deployment destination of the virtual machine among the plurality of physical machines based on the referral result.

13. A program for causing a computer for managing a virtual machine, which is a virtualization of hardware of a computer resource, to realize:
a function of acquiring setting information including a type of software that is running on the virtual machine and an operating policy of the software;
a function of referring to deployment condition determination information which prescribes a deployment condition for selecting a physical machine to become a deployment destination of the virtual machine is associated with the operating policy of the software and stored therein based on the acquired setting information; and
a function of determining the physical machine to become the deployment destination of the virtual machine by selecting the physical machine among the plurality of physical machines based on the referral result, wherein the function of determining the physical machine includes a function of referring to the deployment condition determination information based on the acquired setting information and determining the physical machine to become the deployment destination of the virtual machine based on the referral result; and
a function of storing disk information, wherewith a logical unit that is accessible by each of the physical machines among a plurality of logical units formed in a storage area of a storage apparatus is associated with each of the physical machines and stored in the disk information,
wherein the function of determining the physical machine includes a function of referring to the disk information when physical machines capable of accessing a same logical unit are prescribed as a deployment condition corresponding to the acquired setting information in the deployment condition determination information, and determining the physical machines capable of accessing the same logical unit as the physical machines to become the deployment destination of the virtual machine among the plurality of physical machines based on the referral result.

* * * * *